(12) United States Patent
Cornell

(10) Patent No.: US 10,032,382 B2
(45) Date of Patent: *Jul. 24, 2018

(54) COMMUNICATION OF FLIGHT MANAGEMENT COMPUTER DATA VIA A WIRELESS INTERFACE OF A DATA CAPTURE DEVICE

(71) Applicant: THE BOEING COMPANY, Chicago, IL (US)

(72) Inventor: Bradley D. Cornell, Lake Stevens, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,939

(22) Filed: Jan. 9, 2017

(65) Prior Publication Data

US 2017/0148329 A1 May 25, 2017

Related U.S. Application Data

(63) Continuation-in-part of application No. 14/677,603, filed on Apr. 2, 2015, now Pat. No. 9,557,189.

(51) Int. Cl.
*G08G 5/00* (2006.01)
*B64D 45/00* (2006.01)

(52) U.S. Cl.
CPC .......... *G08G 5/0021* (2013.01); *B64D 45/00* (2013.01); *G08G 5/003* (2013.01); *G08G 5/0004* (2013.01); *G08G 5/0047* (2013.01); *B64D 2045/0075* (2013.01)

(58) Field of Classification Search
CPC .... G08G 5/0021; G08G 5/0004; G08G 5/003; G08G 5/0047; B64D 45/00; B64D 2045/0075
USPC .......................... 701/13, 3; 340/945; 380/270
See application file for complete search history.

(56) References Cited

U.S. PATENT DOCUMENTS

| | | |
|---|---|---|
| 8,432,298 B2 | 4/2013 | McCullough |
| 2007/0027589 A1 | 2/2007 | Brinkley et al. |
| 2007/0055416 A1 | 3/2007 | Allen |
| 2012/0265372 A1 | 10/2012 | Hedrick |
| 2012/0271616 A1 | 10/2012 | Ludwig et al. |
| 2015/0120097 A1 | 4/2015 | Hathaway |
| 2016/0124738 A1* | 5/2016 | Haukom .................. G06F 8/65 717/170 |

* cited by examiner

*Primary Examiner* — Marthe Y Marc-Coleman
(74) *Attorney, Agent, or Firm* — Toler Law Group, P.C.

(57) ABSTRACT

A method includes receiving, at a data capture device associated with a control display unit (CDU) and with a flight management computer (FMC), a first FMC data request from the CDU to the FMC and sending the first FMC data request from the data capture device to the FMC. The method also includes receiving, at the data capture device, first FMC data from the FMC responsive to the first FMC data request. The method further includes sending the first FMC data from the data capture device to the CDU via a communication interface and sending data generated based on the first FMC data from the data capture device to a portable electronic device via a wireless interface of the data capture device.

20 Claims, 11 Drawing Sheets

COMMUNICATION OF FLIGHT MANAGEMENT COMPUTER DATA VIA A WIRELESS INTERFACE OF A DATA CAPTURE DEVICE

CROSS-REFERENCE TO RELATED APPLICATIONS

The present application is a continuation-in-part application of and claims priority to U.S. patent application Ser. No. 14/677,603 entitled "COMMUNICATION OF FLIGHT MANAGEMENT COMPUTER DATA VIA A WIRELESS INTERFACE OF A CONTROL DISPLAY UNIT," filed Apr. 2, 2015, the contents of which are incorporated by reference in their entirety.

FIELD

The present disclosure generally relates to sending flight management computer data via a wireless interface of a data capture device.

BACKGROUND

Electronic flight bag (EFB) applications are gaining wider acceptance. Some types of avionics data that may be useful in performing various calculations (e.g., during a flight) may be unavailable to an EFB application. As such, EFB application functionality may be limited by the particular types of data that are accessible to an EFB application.

SUMMARY

In a particular implementation, a method includes receiving, at a data capture device associated with a control display unit (CDU) and with a flight management computer (FMC), a first FMC data request from the CDU to the FMC and sending the first FMC data request from the data capture device to the FMC. The method also includes receiving, at the data capture device, first FMC data from the FMC responsive to the first FMC data request. The method further includes sending the first FMC data from the data capture device to the CDU via a communication interface and sending data generated based on the first FMC data from the data capture device to a portable electronic device via a wireless interface of the data capture device.

In another implementation, a data capture device includes a processor, a memory, a communication interface to communicate with an FMC and a CDU, a wireless interface, and a data capture component. The data capture component is stored in the memory and is executable by the processor to perform various operations. The operations include receiving an FMC data request from the CDU via the communication interface and sending the FMC data request to the FMC via the communication interface. The operations also include receiving FMC data from the FMC responsive to the FMC data request. The operations further include sending the FMC data to the CDU via the communication interface and sending data generated based on the FMC data to a portable electronic device via the wireless interface.

In another implementation, a vehicle includes an FMC, a CDU, and a data capture device communicatively coupled to the FMC and to the CDU. The data capture device is configured to receive an FMC data request from the CDU via a communication interface and to send the FMC data request to the FMC via the communication interface. The data capture component is further configured to receive FMC data from the FMC responsive to the FMC data request and to send the FMC data to the CDU via the communication interface and data generated based on the FMC data to a portable electronic device via a wireless interface.

The described features, functions, and advantages may be achieved independently in various embodiments or may be combined in yet other embodiments further details of which can be seen with reference to the following description and drawings.

Figure 1:
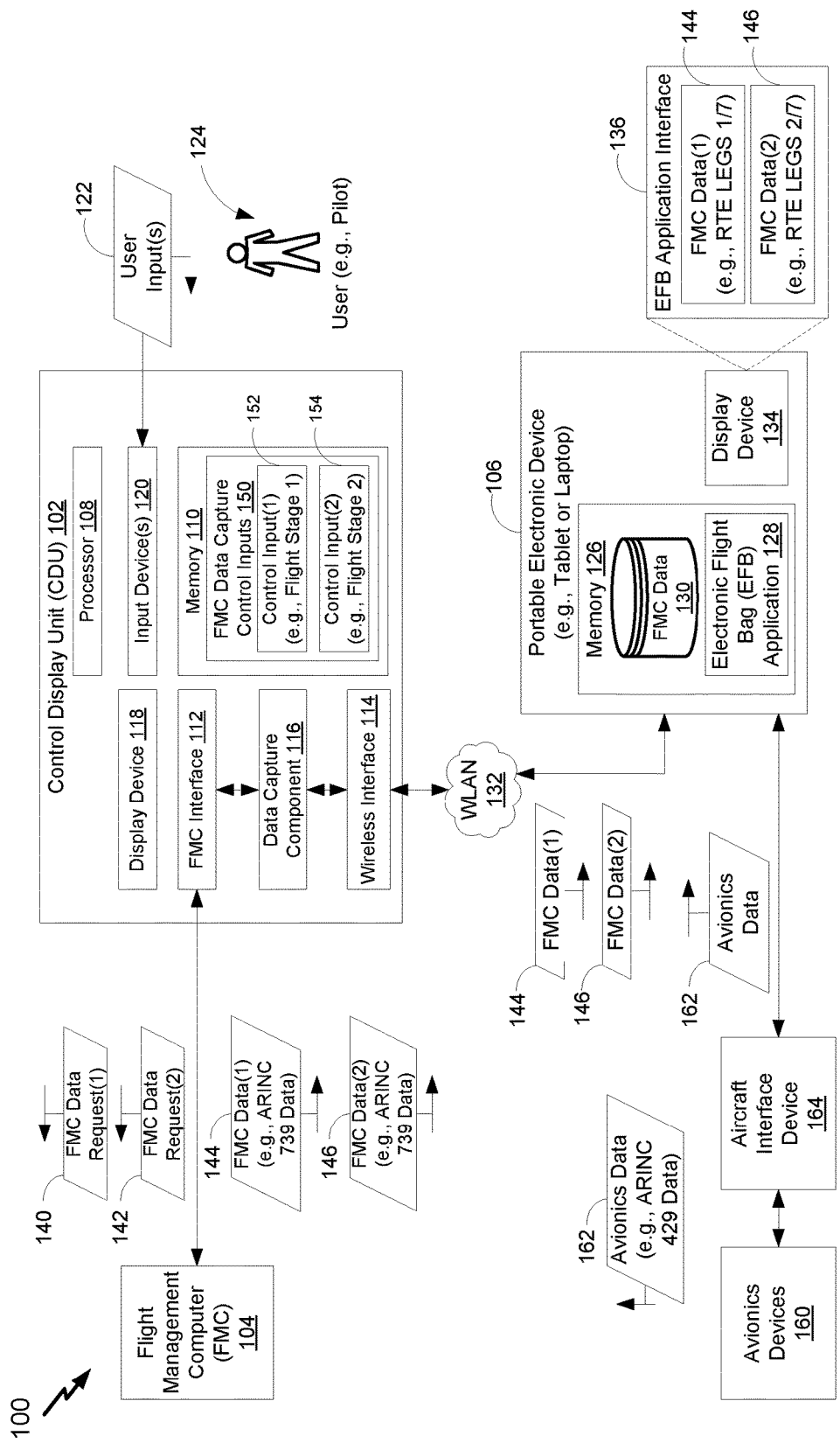
FIG. 1 is a block diagram of a particular embodiment of a system to provide flight management computer (FMC) data from a control display unit (CDU) to a portable electronic device via a wireless interface of the CDU.

Each figure shown in this disclosure shows a variation of an aspect of the embodiments presented, and only differences will be discussed in detail.

DETAILED DESCRIPTION

The present disclosure describes systems and methods of communicating data that is accessible to or computed by a flight management computer (FMC) to a portable electronic device via a wireless interface of a control display unit (CDU) or of a data capture device independent of the CDU. A flight crew member (e.g., a pilot) may utilize an electronic flight bag (EFB) application to perform various calculations (e.g., before takeoff, during a flight, etc.). The EFB application may be stored at a portable electronic device (e.g., a tablet computing device or a laptop computer) that may be carried onto an aircraft by a crew member.

In some cases, an aircraft interface device (AID) other than the CDU may allow an EFB application to access some types of avionics data. In some cases, other types of avionics data (e.g., first avionics data that is communicated from the FMC 104 to the CDU 102) may be inaccessible to the AID. For example, an AID may be used to capture avionics data that is communicated according to an avionics communication standard specified by Aeronautical Radio, Incorporated (ARINC), such as an ARINC 429 standard. The ARINC 429 standard is a multiple-transmitter data bus protocol standard that allows multiple transmitters to share a single bus. Other types of data may be communicated according to another avionics communication standard, such as an ARINC 739 standard. The ARINC 739 standard is a standard for MCDUs and associated interfaces. While an EFB application may be able to access ARINC 429 data in some cases (via an AID), ARINC 739 data may be inaccessible to an EFB application. In the present disclosure, a wireless interface may be incorporated into a CDU in order to enable the CDU to send particular types of avionics data (e.g., ARINC 739 data) to a portable electronic device (for use by an EFB application).

An FMC may be used to perform various navigation and performance calculations. For example, the FMC may provide a pilot (or other crew member) with relatively precise time and fuel predictions based upon airplane performance parameters, such as gross weight, speed, altitude, temperature, and winds. In some cases, the pilot may use a controller (also referred to as a control display unit, or "CDU") to interact with and program the FMC. To illustrate, the pilot may use the CDU to provide flight route information to the FMC, to change the flight route information based on air traffic control (ATC) instructions, and to provide approach/landing information to the FMC, among other alternatives. Examples of data computed by the FMC and provided to the CDU include waypoint information, predicted times and predicted distances, predicted fuel burn for each waypoint, among other data. In the present disclosure, the wireless interface that is incorporated into the CDU may allow the CDU to wirelessly communicate FMC computed data to an EFB application for use in performing various calculations.

The data request operation(s) of the present disclosure may execute "in the background" at the CDU such that FMC data may be provided to an EFB application at an external device in substantially real-time without interfering with pilot activities. Additionally, the data capture operation(s) of the present disclosure may execute "in the background" at the CDU or the data capture device such that FMC data may be provided to an EFB application at an external device in substantially real-time without interfering with pilot activities. As an example, the pilot may not see page change(s) on a display device of the CDU that are associated with requests for different pages of FMC data. As another example, in the event that the pilot interacts with the CDU when a data capture operation is being performed "in the background," the data capture operation may be interrupted so that the CDU may respond to pilot request(s). Thus, from the perspective of the pilot, the CDU may provide the same "look and feel" while background data capture operation(s) are being performed.

FIG. 1 is a system diagram 100 depicting a particular example of a system to provide flight management computer (FMC) data from a control display unit (CDU) to a portable electronic device via a wireless interface of the CDU. FIG. 1 illustrates that data (e.g., FMC data) that is computed by or accessible to the FMC is communicated to the CDU and may be sent to the portable electronic device via a wireless interface of the CDU. An electronic flight bag (EFB) application at the portable electronic device may utilize the FMC data that is provided via the wireless interface of the CDU to perform various calculations.

In the example illustrated in FIG. 1, the system 100 includes a control display unit (CDU) 102, a flight management computer (FMC) 104, and a portable electronic device 106. The CDU 102 includes a processor 108, a memory 110, a communication interface 112 (identified as "FMC Interface" in FIG. 1) to communicate with the FMC 104, and a wireless interface 114. In a particular embodiment, the wireless interface 114 may be configured to send and/or receive data in accordance with an Institute of Electrical and Electronics Engineers (IEEE) 802.11 wireless communication protocol. In another embodiment, the wireless interface 114 may be configured to send and/or receive data in accordance with a near field communication (NFC) standard.

In a particular embodiment, the CDU 102 may be a multiple-purpose control and display unit (MCDU), and the FMC data (e.g., first avionics data) may be communicated from the FMC 104 to the CDU 102 in accordance with a first avionics communication standard (e.g., a standard for MCDUs and associated interfaces, such as the ARINC 739 standard). In other embodiments, the FMC data (e.g., first avionics data) may be communicated from the FMC 104 to the CDU 102 in accordance with a second avionics communication standard (e.g., the ARINC 429 standard). The CDU 102 further includes a data capture component 116 that is executable by the processor 108 to perform various operations. FIG. 1 illustrates the data capture component 116 as being separate from the memory 110 for illustrative purposes only. In some cases, the data capture component 116 may be stored in the memory 110. It will be appreciated that the data capture component 116 may be implemented in hardware, software, or a combination thereof.

FIG. 1 further illustrates that the CDU 102 includes a display device 118 and an input device 120 (or multiple input devices). As further described herein with respect to FIGS. 2 and 3, the display device 118 may display information responsive to a user input 122 (or multiple user inputs) received from a user 124 (e.g., a crew member, such as a pilot or a co-pilot) via the input device 120. Alternatively or additionally, the display device 118 may display information that is received at the CDU 102 from the FMC 104 and/or other information from one or more avionics devices that are accessible to the CDU 102.

FIG. 1 illustrates that the portable electronic device 106 (e.g., a tablet computing device or a laptop computer) may include a memory 126 to store an electronic flight bag (EFB) application 128 (or multiple EFB applications). FIG. 1 further illustrates that the memory 126 may include an FMC data store 130 that includes FMC data that is received at the portable electronic device 106 via one or more wireless transmissions from the CDU 102 (e.g., data communicated from the CDU 102 via a wireless local area network (WLAN) 132). The portable electronic device 106 further includes a display device 134 (e.g., a second display device that is different from the display device 118 of the CDU 102). The portable electronic device 106 may be configured to display an EFB application interface 136 associated with the EFB application 128 via the display device 134.

The data capture component 116 of the CDU 102 is configured to generate FMC data requests to be sent to the FMC 104 via the FMC interface 112. For illustrative purposes only, FIG. 1 illustrates that the data capture component 116 may generate a first FMC data request 140 (identified as "FMC Data Request(1)" in FIG. 1) and a second FMC data request 142 (identified as "FMC Data Request(2)" in FIG. 1). The FMC 104 is configured to provide first FMC data 144 (identified as "FMC Data(1)" in FIG. 1) to the CDU 102 responsive to the first FMC data request 140. The FMC 104 is further configured to provide second FMC data 146 (identified as "FMC Data(2)" in FIG. 1) to the CDU 102 responsive to the second FMC data request 142. The data capture component 116 may be configured to generate the first FMC data request 140 and/or the second FMC data request 142 responsive to manual control input(s) received via the input device(s) 120 of the CDU 102, responsive to data capture script(s) stored in the memory 110 that operate "in the background" to automatically capture particular FMC data, or responsive to request(s) received for particular FMC data from another device (e.g., from the portable electronic device 106 via the wireless interface 114).

In some implementations, control input information associated with an FMC data request (or multiple FMC data requests) may be stored in the memory 110 of the CDU 102. In some cases, the data capture component 116 may be configured to "operate in the background" by automatically generating FMC data request(s) based on the control input information stored in the memory 110. To illustrate, the control input information may correspond to a particular FMC data request to be generated at a particular flight stage. As an example, the data capture component 116 may be configured to automatically generate an FMC data request (e.g., at a first flight stage) based on first control input information stored in the memory 110. As another example, the data capture component 116 may be configured to automatically generate an FMC data request (e.g., at a second flight stage) based on second control input information stored in the memory 110. In some cases, the FMC data that is received at the CDU 102 from the FMC 104 responsive to a particular FMC data request may not be displayed at the display device 118 of the CDU 102.

In the particular embodiment illustrated in FIG. 1, one or more FMC data capture control inputs 150 are stored in the memory 110 of the CDU 102. In the example of FIG. 1, the FMC data capture control input(s) 150 include a first data capture control input 152 (identified as "Control Input(1)" in FIG. 1) and a second data capture control input 154 (identified as "Control Input(2)" in FIG. 1). To illustrate, the first data capture control input 152 may be associated with a first flight stage and may include first control input information corresponding to a particular FMC data request (e.g., the first FMC data request 140) to be generated at the first flight stage. As another example, the second data capture control input 154 may be associated with a second flight stage and may include second control input information corresponding to a particular FMC data request (e.g., the second FMC data request 142) to be generated at the second flight stage. In alternative embodiments, the FMC data capture control input(s) 150 may include a different number of data capture control inputs (e.g., associated with an alternative number of flight stages, times, parameters, etc.). In some cases, a particular data capture "script" may be stage-of-flight dependent (e.g., on the ground, in-flight, below a particular air/ground speed, below a particular altitude, or a combination thereof). As an example, the first data capture control input 152 may be automatically invoked and executed "in the background" at the CDU 102 when the aircraft is above or below a first altitude threshold and is operating above or below a first air speed threshold. As another example, the second data capture control input 154 may be automatically invoked and executed "in the background" at the CDU 102 when the aircraft is above or below a second altitude threshold and is operating above or below a second air speed threshold.

FIG. 1 further illustrates that the FMC 104 may be configured to communicate with multiple avionics devices 160. In a particular embodiment, avionics data 162 may be communicated between a first avionics device and a second avionics device in accordance with an avionics communication standard that is different from an avionics communication standard (e.g., the ARINC 739 standard or the ARINC 429 standard) associated with communication between the FMC 104 and the CDU 102. As an illustrative, non-limiting example, the second avionics communication standard may be a multiple-transmitter data bus protocol standard that allows multiple transmitters to share a single bus (e.g., the ARINC 429 standard). FIG. 1 illustrates that, in some cases, the avionics data 162 may be accessible to the portable electronic device 106 via an aircraft interface device 164 that is different from the CDU 102.

In some cases, the FMC 104 may be configured to receive data from air traffic control (ATC) systems before and/or during a flight. Further, the FMC 104 may be configured to receive input(s) from the user 124 (e.g., the pilot) before and/or during a flight. In a particular embodiment, the data capture component 116 of the CDU 102 may be configured to retrieve such information from the FMC 104 (e.g., while the aircraft is on the ground). The data capture component 116 of the CDU 102 may be configured to provide the captured FMC data to the EFB application 128 of the portable electronic device 106 via the wireless interface 114 (for use in performing various calculations). In some cases, the EFB application 128 may be configured to query the CDU 102 for particular data (e.g., before and/or during flight), and the data capture component 116 of the CDU 102 may be configured to generate requests for associated FMC data in response to the query and to provide the FMC data to the EFB application 128. In some cases, the EFB application 128 may send a "trigger" to the CDU 102 that includes a set of parameters, and the data capture component 116 of the CDU 102 may respond to the "trigger" by generating one or more FMC data request(s) based on the set of parameters. Data received from the FMC 104 responsive to the FMC data request(s) generated based on the parameter(s) may be communicated from the CDU 102 to the EFB application 128. In the present disclosure, while the CDU 102 may be modified to include the wireless interface 114 in order to wirelessly communicate with the portable electronic device 106, there may be no changes to the FMC interface 112 and/or the FMC 104. As communications between the CDU 102 and the FMC 104 may utilize an approved (e.g., certified) FMC interface 112, there may be no additional approval/certification that may be cumbersome and/or costly.

In some embodiments, data from the FMC 104 may be periodically synchronized with information that is stored at the FMC data store 130 of the portable electronic device 106. As an example, the user 124 (e.g., the pilot) may initiate a data synchronization operation. As another example, synchronization may occur automatically at one or more pre-determined times and/or pre-determined intervals. To illustrate, the FMC data capture control inputs 150 may include a synchronization control input that may be communicated from the data capture component 116 to the FMC 104, and the FMC 104 may provide particular data to the CDU 102 in response to the synchronization control input.

In a particular embodiment, while not shown in the example of FIG. 1, the EFB application interface 136 may allow the user 124 to input various flight data (e.g., before and/or during a flight). In some cases, information that is provided by the user 124 may be used by the EFB application 128 to provide data to the CDU 102 via the wireless interface 114. The data that is provided to the CDU 102 may be displayed to the user 124 via the display device 118 of the CDU 102, and the user 124 may review the data for submission to the FMC 104. In a particular embodiment, the data capture component 116 may be configured to (automatically) provide updated information to the portable electronic device 106 (e.g., in response to the user 124 updating a flight route during flight via the CDU 102 due to weather, etc.). The updated information may allow the EFB application 128 of the portable electronic device 106 to (automatically) update various calculations for display via the EFB application interface 136.

In operation, the data capture component 116 of the CDU 102 may generate an FMC data request. As described further herein with respect to FIGS. 2 and 3, in some cases, the data capture component 116 may generate an FMC data request based on a particular control input (or sequence of control inputs) received from the user 124 (e.g., the pilot) via one or more selectable control inputs of the CDU 102. In other cases, the data capture component 116 may automatically generate an FMC data request based on information stored in the memory 110 of the CDU 102 (e.g., based on the FMC data capture control input(s) 150 that may be associated with different flight stages, times, parameters, etc.). The data capture component 116 may send the FMC data request to the FMC 104 via the FMC interface 112, and the FMC 104 may obtain (e.g., compute) data to be provided to the CDU 102 based on the particular FMC data request received from the CDU 102.

Figure 2:
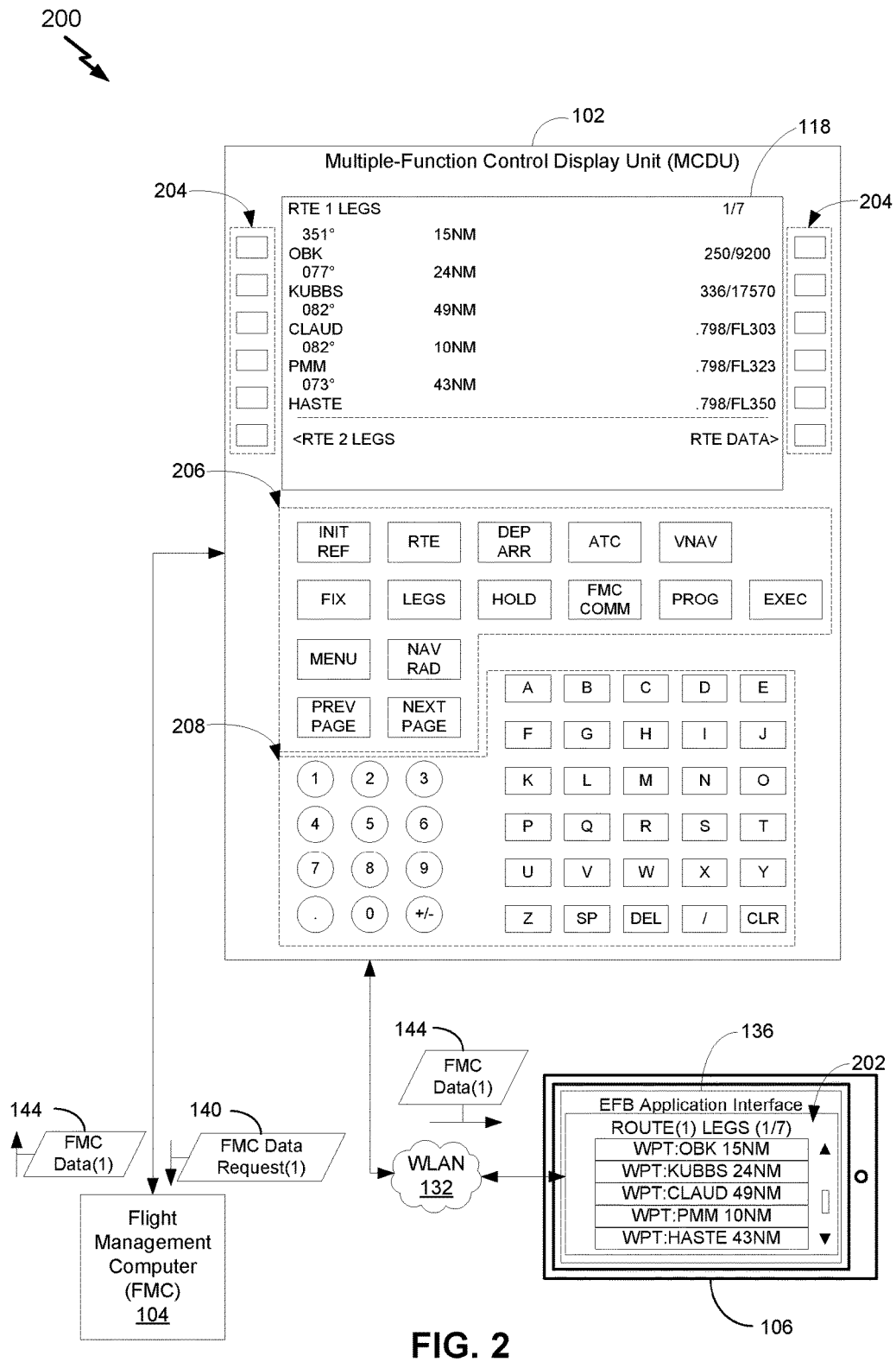
FIG. 2 is a block diagram of a particular embodiment of a system to provide FMC data from a CDU (e.g., a multiple-function CDU) to an electronic flight bag (EFB) application of a portable electronic device via a wireless interface of the CDU.

As an illustrative, non-limiting example, a first flight stage may correspond to a first set of waypoints. To illustrate, as described further herein with respect to FIG. 2, the data capture component 116 may generate the first FMC data request 140 responsive to user selection of a first selectable control input (e.g., a "LEGS" key) of the CDU 102. In this case, the first FMC data 144 may represent information associated with the first set of waypoints. For example, as illustrated in FIG. 2, the first FMC data 144 may include a listing of the first set of waypoints, airspeed/altitude predictions and constraints, distances between legs, winds, magnetic (or true) headings between legs, and/or estimated times of arrival, among other alternatives.

Figure 3:
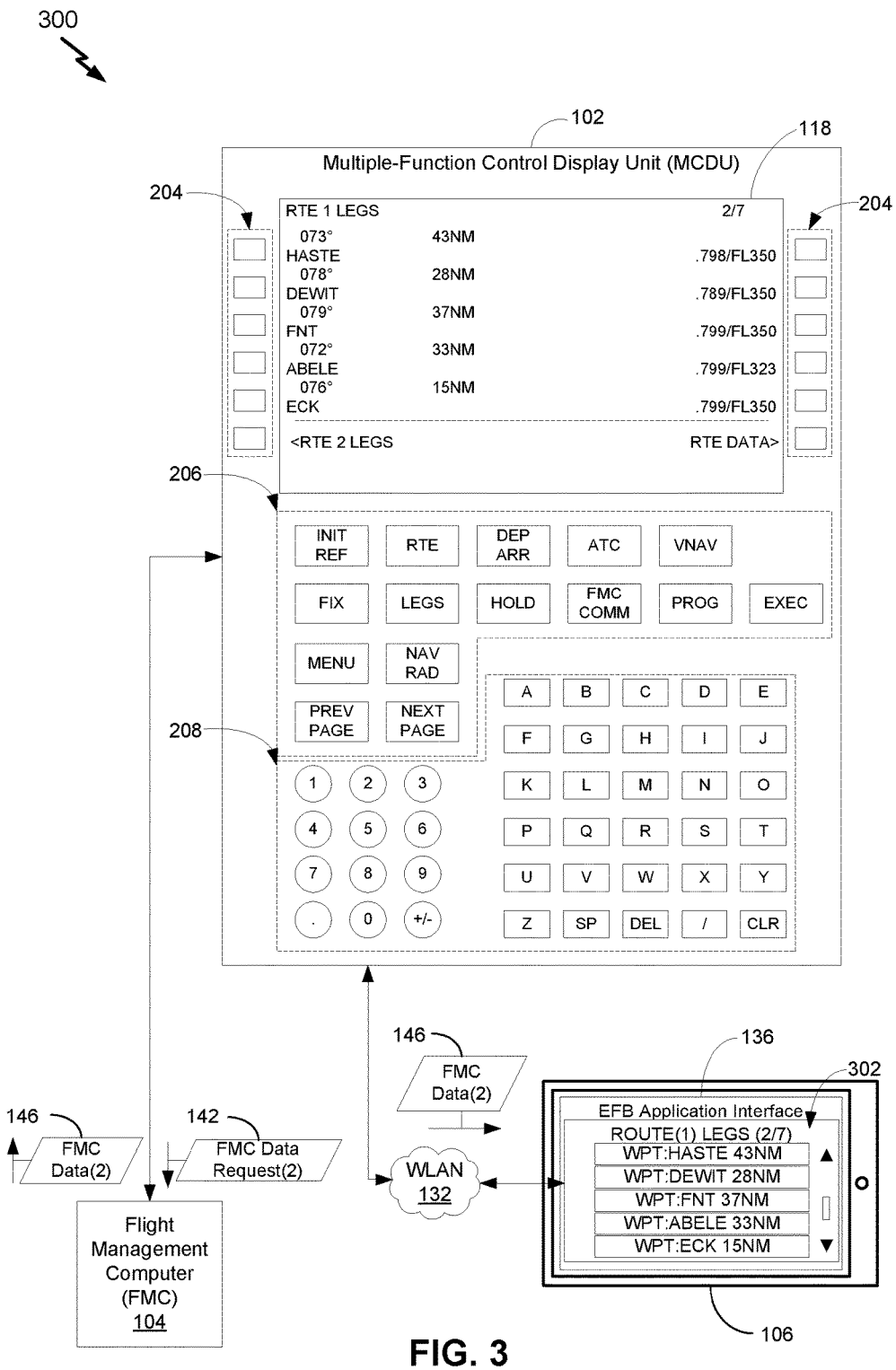
FIG. 3 is a block diagram of another particular embodiment of a system to provide FMC data from a CDU (e.g., a multiple-function CDU) to an EFB application of a portable electronic device via a wireless interface of the CDU.

As another illustrative example, a second flight stage may correspond to a second set of waypoints. To illustrate, as described further herein with respect to FIG. 3, the data capture component 116 may generate the second FMC data request 142 responsive to user selection of a second selectable control input (e.g., a "NEXT PAGE" key) of the CDU 102. In this case, the second FMC data 146 may represent information associated with the second set of waypoints. For example, as illustrated in FIG. 3, the second FMC data 146 may include a listing of the second set of waypoints, airspeed/altitude predictions and constraints, distances between legs, winds, magnetic (or true) headings between legs, and/or estimated times of arrival, among other alternatives.

In a particular embodiment, the first data capture control input 152 may allow the data capture component 116 of the CDU 102 to "automatically" (e.g., without user input) capture the first FMC data 144 (e.g., data computed by the FMC 104 for the first set of waypoints) to be provided to the EFB application 128 via the wireless interface 114 of the CDU 102. The second data capture control input 154 may allow the data capture component 116 of the CDU 102 to automatically capture the second FMC data 146 (e.g., data computed by the FMC 104 for the second set of waypoints) to be provided to the EFB application 128 via the wireless interface 114 of the CDU 102. It will be appreciated that the data capture component 116 may refrain from generating/sending FMC data request(s) in the event that a manual control input is received from the user 124 via the input device(s) 120 of the CDU 102. In some cases, the data capture component 116 may resume generating/sending FMC data request(s) after a threshold amount of time has elapsed after receipt of the manual control input (e.g., 100 milliseconds after receiving a last manual control input). Thus, the data capture component 116 may include logic that allows the CDU 102 to respond to typical requests for data from the user 124 without interfering with pilot activities.

The data capture component 116 may send the FMC data received from the FMC 104 to the portable electronic device 106 via the wireless interface 114 of the CDU 102. In a particular implementation, the FMC data may be sent to the portable electronic device 106 in accordance with an IEEE 802.11 wireless communication protocol. In another implementation, the FMC data may be sent to the portable electronic device 106 in accordance with a near field communication (NFC) standard. In some cases, the FMC data received at the portable electronic device 106 may be stored in the FMC data store 130. The EFB application 128 may generate the EFB application interface 136 based on the FMC data received from the CDU 102. The EFB application interface 136 may be displayed at the display device 134 of the portable electronic device 106.

As an illustrative, non-limiting example, the first FMC data 144 presented via the EFB application interface 136 may include at least a portion of information computed by the FMC 104 for a first set of waypoints (e.g., a first page out of seven pages of "RTE LEGS" data, as shown in FIG. 2). As another example, the second FMC data 146 presented via the EFB application interface 136 may include at least a portion of information computed by the FMC 104 for a second set of waypoints (e.g., a second page out of the seven pages of "RTE LEGS" data, as shown in FIG. 3).

Thus, FIG. 1 illustrates that data computed by or accessible to an FMC responsive to an FMC data request from a CDU may be sent to a portable electronic device via a wireless interface of the CDU. In some cases, the FMC data request may be communicated from the CDU to the FMC via a particular data bus (e.g., an ARINC 739 data bus or an ARINC 429 data bus), and the data computed by or accessible to the FMC responsive to the FMC data request (e.g., ARINC 739 data or ARINC 429 data) may be communicated from the FMC to the CDU via the particular data bus. Communications between the CDU and the FMC via the particular data bus may be inaccessible to the portable electronic device via an AID that is different from the CDU. For example, the AID may be able to capture data communicated between avionics devices via another type of data bus (e.g., an ARINC 429 data bus) for display via an EFB application. The AID may be unable to capture data that is communicated over the ARINC 739 data bus. Thus, the wireless device of the CDU may provide an EFB application of the portable electronic device with access to FMC data to perform various operations.

Referring to FIG. 2, a particular embodiment of a system that includes a CDU (e.g., a multiple-function control display unit (MCDU)) associated with an FMC is illustrated and generally designated 200. In some cases, the CDU 102 illustrated in FIG. 2 may correspond to the CDU 102 of FIG.

1, and the FMC 104 of FIG. 2 may correspond to the FMC 104 of FIG. 1. FIG. 2 illustrates that a first control input may correspond to a request for data associated with a first set of waypoints (or multiple sets of waypoints). In some cases, the first control input may correspond to the first FMC data request 140 of FIG. 1. FIG. 2 illustrates that the first FMC data 144 that is provided by the FMC 104 to the CDU 102 may represent data associated with the first set of waypoints. The first FMC data 144 may be communicated via a wireless interface (not shown in FIG. 2, see e.g., the wireless interface 114 of FIG. 1) of the CDU 102 to the portable electronic device 106 for display via the EFB application interface 136. FIG. 2 illustrates that at least a portion 202 of the first FMC data 144 may be displayed via the EFB application interface 136 at the portable electronic device 106.

FIG. 2 illustrates that the data capture component 116 (see FIG. 1) of the CDU 102 is configured to generate the first FMC data request 140 in response to selection of a particular selectable control input of a plurality of selectable control inputs of the CDU 102. FIG. 2 further illustrates that the first FMC data 144 (e.g., the first set of waypoints) that is sent to the portable electronic device 106 includes particular FMC data that is generated by the FMC 104 for display at the display device 118 of the CDU 102 responsive to selection of the particular selectable control input (e.g., by the user 124 of FIG. 1).

In the particular embodiment illustrated in FIG. 2, information associated with the first set of waypoints is displayed via the display device 118 of the CDU 102. In alternative embodiments, the first FMC data request 140 may be communicated to the FMC 104 without user input (e.g., responsive to the first control input 152 stored in the memory 110 of the CDU 102, as shown in FIG. 1). In this case, the data associated with the first set of waypoints may be communicated for display via the EFB application interface 136 of the portable electronic device 106 but may not be displayed via the display device 118 of the CDU 102. Thus, it will be appreciated that the display of the first FMC data 144 via the display device 118 of the CDU 102 (as shown in FIG. 2) is for illustrative purposes only (in order to show a first example of data that may be accessible to a pilot via the CDU 102 during a flight).

In the particular embodiment illustrated in FIG. 2, the CDU 102 includes a plurality of line select keys 204, a plurality of function/mode keys 206, and a plurality of data entry keys 208. In alternative embodiments, different numbers and/or types of selectable inputs may be associated with the CDU 102. FIG. 2 illustrates an example of information that may be displayed via the display device 118 of the CDU 102. A title field may identify a displayed page and indicate whether there are additional pages in a set. In the example illustrated in FIG. 2, the displayed page includes a first "RTE 1 LEGS page" of a set of seven pages (identified as "1/7" in FIG. 2). The CDU 102 may include a left field, a center field, and a right field. In the example of FIG. 2, the fields include up to six pairs of lines, extending from left to center and right to center of the display device 118. A line pair may include a label line and a data line. The pilot may control the left and right data fields with adjacent line select keys 204.

The first RTE LEGS page illustrated in FIG. 2 presents a listing of consecutive waypoints of each leg on a route, along with various information for each of the waypoints. FIG. 2 illustrates an example of information associated with a set of waypoints that may be displayed, including a distance between waypoints, heading/course between waypoints, airspeed/altitude constraints at a waypoint, and airspeed/altitude predictions at a waypoint, among other alternatives.

In FIG. 2, the first page includes a first set of waypoints, including an active waypoint (OBK) followed by multiple subsequent waypoints (e.g., KUBBS, CLAUD, PMM, and HASTE). The first set of waypoints displayed in FIG. 2 may be displayed in response to selection of a first selectable input (e.g., a "LEGS" key) of the plurality of function/mode keys 206. In the example of FIG. 2, the FMC 104 projects that the aircraft is expected to cross over the first waypoint (OBK) at an airspeed of 250 knots at an altitude of 9200 feet. As the aircraft passes over the first waypoint (OBK), the RTE LEGS display set may move upward, deleting the waypoint that has been passed (OBK) and inserting a next waypoint (KUBBS) in the set as the active waypoint at the top of the set of waypoints.

FIG. 2 further illustrates that the portion 202 of the first FMC data 144 that is displayed via the EFB application interface 136 may include a subset of the first FMC data 144. As an alternative example, the EFB application interface 136 may replicate the information to be displayed at the display device 118 of the CDU 102 responsive to the CDU 102 receiving the first FMC data 144 from the FMC 104. In the example of FIG. 2, the portion 202 of the first FMC data 144 includes a waypoint name and a distance (in nautical miles). For example, the EFB application interface 136 of FIG. 2 displays a name of each of the multiple waypoints (e.g., OBK, KUBBS, CLAUD, PMM, and HASTE) along with the distance (e.g., 15 NN, 24 NM, 49 NM, 10 NM, and 43 NM, respectively).

Thus, FIG. 2 illustrates an example of a first control input corresponding to a first request for FMC data. At least a portion of data that is provided by the FMC responsive to the first request may be communicated via a wireless interface of the CDU to the portable electronic device for display via an EFB application interface. In the example of FIG. 2, the data from the FMC corresponds to a first set of waypoints. In some cases, the FMC may provide the data associated with the first set of waypoints in response to selection of a first selectable input (e.g., a "LEGS" key) by a user (e.g., a pilot). Alternatively, the FMC may provide the data associated with the first set of waypoints automatically (e.g., without user input). Thus, while FIG. 2 illustrates an example in which FMC data is displayed at the display device of the CDU, in other cases the FMC data may be provided to the portable electronic device without the FMC data being displayed at the display device of the CDU.

In the illustrative example of FIG. 2, the first FMC data request 140 corresponds to a request for data associated with a single set of waypoints (e.g., waypoints OBK, KUBBS, CLAUD, PMM, and HASTE, corresponding to a first page of seven pages of "LEGS" data). Alternatively, the first FMC data request 140 may represent a request for data associated with multiple sets of waypoints (e.g., the first set of waypoints illustrated in FIG. 2, a second set of waypoints illustrated in FIG. 3, or more than two sets of waypoints, such as each waypoint for a particular flight route). In some cases, information associated with more than one set of waypoints may be provided to the portable electronic device 106 for display via the EFB application interface 136. Thus, while the CDU 102 may display information for a single set of waypoints (e.g., the first set of waypoints illustrated in FIG. 2 or a second set of waypoints illustrated in FIG. 3), alternative and/or additional information may be displayed at the EFB application interface 136. As an illustrative example, the CDU 102 may display a single page of the seven pages of "LEGS" data, and the CDU 102 may send information associated with each page of the seven pages of "LEGS" data via the wireless interface 114 to the portable electronic device 106 (for display via the EFB application interface 136).

FIG. 3 illustrates second FMC data 146 at the CDU 102. In the example of FIG. 3, the second FMC data 146 may include data associated with a second set of waypoints. The second FMC data 146 may be communicated via a wireless interface (not shown in FIG. 3, see e.g., the wireless interface 114 of FIG. 1) of the CDU 102 to the portable electronic device 106 for display via the EFB application interface 136. FIG. 3 illustrates that at least a portion 302 of the second FMC data 146 may be displayed via the EFB application interface 136 at the portable electronic device 106.

In the particular embodiment illustrated in FIG. 3, information associated with the second set of waypoints is displayed in the display portion 202 of the CDU 102. In alternative embodiments, the second FMC data request 142 may be communicated to the FMC 104 without user input (e.g., responsive to the second control input 154 stored in the memory 110 of the CDU 102, as shown in FIG. 1). In this case, the data associated with the second set of waypoints may be communicated for display via the EFB application interface 136 of the portable electronic device 106 but may not be displayed in the display portion 202 of the CDU 102. Thus, it will be appreciated that the display of the second FMC data 146 via the display device 118 of the CDU 102 is for illustrative purposes only (in order to show a second example of data that may typically be displayed to a pilot during a flight).

In the example illustrated in FIG. 3, the displayed page includes a second "RTE 1 LEGS page" of the set of seven pages (identified as "2/7" in FIG. 3). In FIG. 3, the second page includes a second set of waypoints, including an active waypoint (HASTE) followed by multiple subsequent waypoints (e.g., DEWIT, FNT, ABELE, and ECK). The second set of waypoints displayed in FIG. 3 may be displayed in response to selection of a second selectable input (e.g., a "NEXT PAGE" key) of the plurality of function/mode keys 206. As the aircraft passes over the first waypoint (e.g., HASTE in the example of FIG. 3), the RTE LEGS display set may move upward, deleting the waypoint that has been passed (HASTE) and inserting a next waypoint (DEWIT) in the set as the active waypoint at the top of the set of waypoints.

FIG. 3 further illustrates that the portion 302 of the second FMC data 146 that is displayed via the EFB application interface 136 may include a subset of the second FMC data 146. As an alternative example, the EFB application interface 136 may replicate the information to be displayed at the display device 118 of the CDU 102 responsive to the CDU 102 receiving the second FMC data 146 from the FMC 104. In the example of FIG. 3, the portion 302 of the second FMC data 146 includes a waypoint name and a distance (in nautical miles). For example, the EFB application interface 136 of FIG. 3 displays a name of each of the multiple waypoints (e.g., HASTE, DEWIT, FNT, ABELE, and ECK) along with the distance (e.g., 43 NN, 28 NM, 37 NM, 33 NM, and 15 NM, respectively).

Thus, FIG. 3 illustrates an example of a second control input corresponding to a second request for FMC computed data. At least a portion of data that is provided by the FMC responsive to the second request may be communicated via a wireless interface of the CDU to the portable electronic device for display via an EFB application interface. In the example of FIG. 3, the data computed by the FMC corresponds to a second set of waypoints. In some cases, the FMC may provide the data associated with the second set of waypoints in response to selection of a second selectable input (e.g., a "NEXT PAGE" key) by a user (e.g., a pilot). Alternatively, the FMC may provide the data associated with the second set of waypoints automatically (e.g., without user input). Thus, while FIG. 3 illustrates an example in which FMC data is displayed at the display device of the CDU, in other cases the FMC data may be provided to the portable electronic device without the FMC data being displayed at the display device of the CDU.

Figure 4:
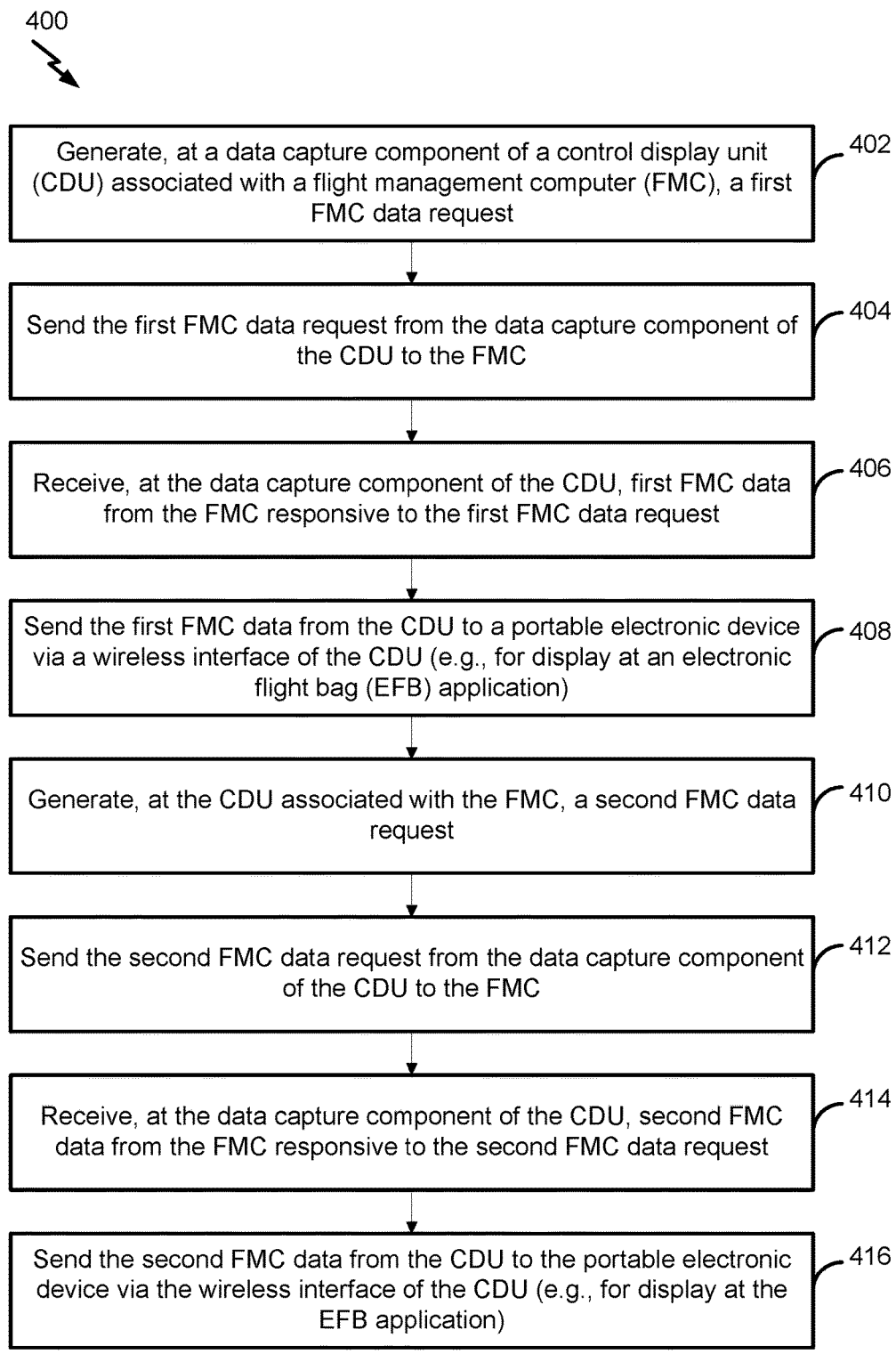
FIG. 4 is a flowchart depicting a particular embodiment of a method of providing FMC data from a CDU to a portable electronic device via a wireless interface of the CDU.

FIG. 4 is a flowchart depicting an exemplary embodiment of a method 400 of providing FMC data from a CDU to a portable electronic device via a wireless interface of the CDU. FIG. 4 illustrates that a data capture component of a CDU (e.g., the data capture component 116 of the CDU 102) may generate an FMC data request, send the FMC data request to an FMC (e.g., via an ARINC 739 data bus between the CDU and the FMC), receive FMC computed data, and send the FMC computed data via a wireless interface of the CDU to the portable electronic device (e.g., for use by an EFB application). As described further herein, in some cases, the data capture component may generate the FMC data request in response to selection of a particular selectable control input (or set of control inputs) by a user, such as a pilot. In other cases, the data capture component may generate the FMC data request automatically (e.g., without user input via the CDU) at particular time(s), flight stage(s), etc. based on information stored in a memory of the CDU.

The method 400 includes generating, at a data capture component of a CDU associated with an FMC, a first FMC data request, at 402. For example, referring to FIG. 1, the data capture component 116 of the CDU 102 associated with the FMC 104 may generate the first FMC data request 140. As an illustrative example, FIG. 2 illustrates that the first FMC data request 140 may correspond to a selection of a particular selectable control input associated with the CDU 102 (e.g., the "LEGS" key). As explained further herein, in some cases the first FMC data request 140 may be generated at the CDU 102 in response to a user selection of the particular selectable control input (e.g., the "LEGS" key of FIG. 2). In other cases, the CDU 102 may automatically generate the first FMC data request 140 (e.g., based on the first data capture control input 152 stored in the memory 110 of the CDU 102, as shown in FIG. 1).

The method 400 includes sending the FMC data request from the data capture component of the CDU to the FMC, at 404. For example, referring to FIG. 1, the data capture component 116 of the CDU 102 may send the first FMC data request 140 to the FMC 104 (e.g., via the FMC interface 112). As an illustrative example, FIG. 2 illustrates that the first FMC data request 140 may be sent from the CDU 102 to the FMC 104 responsive to selection of the "LEGS" key. In other cases, the CDU 102 may send the first FMC data request 140 (that may correspond to a control input associated with the "LEGS" key illustrated in FIG. 2) without user selection (e.g., without user selection of the "LEGS" key via the CDU 102).

The method 400 also includes receiving, at the data capture component of the CDU, FMC data from the FMC responsive to the FMC data request, at 406. For example, referring to FIG. 1, the data capture component 116 of the CDU 102 may receive the first FMC data 144 responsive to the first FMC data request 140. As an illustrative example, FIG. 2 illustrates that the CDU 102 may receive the first FMC data 144 corresponding to the first set of waypoints (e.g., OBK, KUBB, CLAUD, PMM, and HASTE) from the FMC 104. FIG. 2 further illustrates a particular example in which the first FMC data 144 received from the FMC 104 may be displayed via the display device 118 of the CDU 102. Alternatively, the first FMC data 144 may be received at the FMC 104 but may not be displayed at the CDU 102 (e.g., when the first FMC data request 140 is automatically generated by the data capture component 116 without user input).

The method 400 further includes sending the FMC data from the CDU to a portable electronic device via a wireless interface of the CDU, at 408. For example, the data capture component 116 of the CDU 102 may send the first FMC data 144 to the portable electronic device 106 via the wireless interface 114 of the CDU 102. As an illustrative example, FIG. 2 illustrates that the first FMC data 144 received from the FMC 104 at the CDU 102 may be sent to the portable electronic device 106 via the wireless interface 114 of the CDU 102. FIG. 2 further illustrates an embodiment in which a subset (e.g., the portion 202) of the first FMC data 144 (e.g., the first set of waypoint names and distances in nautical miles) may be displayed via the EFB application interface 136 of the portable electronic device 106.

In the particular embodiment illustrated in FIG. 4, the method 400 further includes generating, at the data capture component of the CDU associated with the FMC, a second FMC data request, at 410. For example, referring to FIG. 1, the data capture component 116 may generate the second FMC data request 142. As an illustrative example, FIG. 3 illustrates that the second FMC data request 142 may correspond to a selection of another selectable control input associated with the CDU 102 (e.g., the "NEXT PAGE" key). As explained further herein, in some cases the second FMC data request 142 may be generated at the CDU 102 in response to a user selection of the selectable control input (e.g., the "NEXT PAGE" key of FIG. 3). In other cases, the CDU 102 may automatically generate the second FMC data request 142 (e.g., based on the second data capture control input 154 stored in the memory 110 of the CDU 102, as shown in FIG. 1).

The method 400 may further include sending the second FMC data request from the data capture component of the CDU to the FMC, at 412. For example, referring to FIG. 1, the data capture component 116 of the CDU 102 may send the second FMC data request 142 to the FMC 104 (e.g., via the FMC interface 112). As an illustrative example, FIG. 3 illustrates that the second FMC data request 142 may be sent from the CDU 102 to the FMC 104 responsive to selection of the "NEXT PAGE" key. In other cases, the CDU 102 may send the second FMC data request 142 (that may correspond to a control input associated with the "NEXT PAGE" key illustrated in FIG. 3) without user selection (e.g., without user selection of the "NEXT PAGE" key via the CDU 102).

The method 400 may also include receiving, at the data capture component of the CDU, second FMC data from the FMC responsive to the second FMC data request, at 414. For example, referring to FIG. 1, the data capture component 116 of the CDU 102 may receive the second FMC data 146 responsive to the second FMC data request 142. As an illustrative example, FIG. 3 illustrates that the CDU 102 may receive the second FMC data 146 corresponding to the second set of waypoints (e.g., HASTE, DEWIT, FNT, ABELE, and ECK) from the FMC 104. FIG. 3 further illustrates a particular example in which the second FMC data 146 received from the FMC 104 may be displayed via the display device 118 of the CDU 102. Alternatively, the second FMC data 146 may be received at the FMC 104 but may not be displayed at the CDU 102 (e.g., when the second FMC data request 142 is automatically generated by the data capture component 116 without user input).

The method 400 may further include sending the second FMC data from the CDU to the portable electronic device via the wireless interface of the CDU, at 416. For example, the data capture component 116 of the CDU 102 may send the second FMC data 146 to the portable electronic device 106 via the wireless interface 114 of the CDU 102. As an illustrative example, FIG. 3 illustrates that the second FMC data 146 received from the FMC 104 at the CDU 102 may be sent to the portable electronic device 106 via the wireless interface 114 of the CDU 102. FIG. 3 further illustrates an embodiment in which a subset (e.g., the portion 302) of the second FMC data 146 (e.g., the second set of waypoint names and distances in nautical miles) may be displayed via the EFB application interface 136 of the portable electronic device 106.

Thus, FIG. 4 illustrates that FMC computed data that may be provided to a CDU may be made available to an EFB application of a portable electronic device via a wireless interface of the CDU. The FMC and the CDU may communicate via a data bus (e.g., an ARINC 739 data bus) that may be inaccessible to an EFB application via an AID. The additional FMC computed data may be useful for performing various additional operations/calculations at the EFB application.

Figure 5:
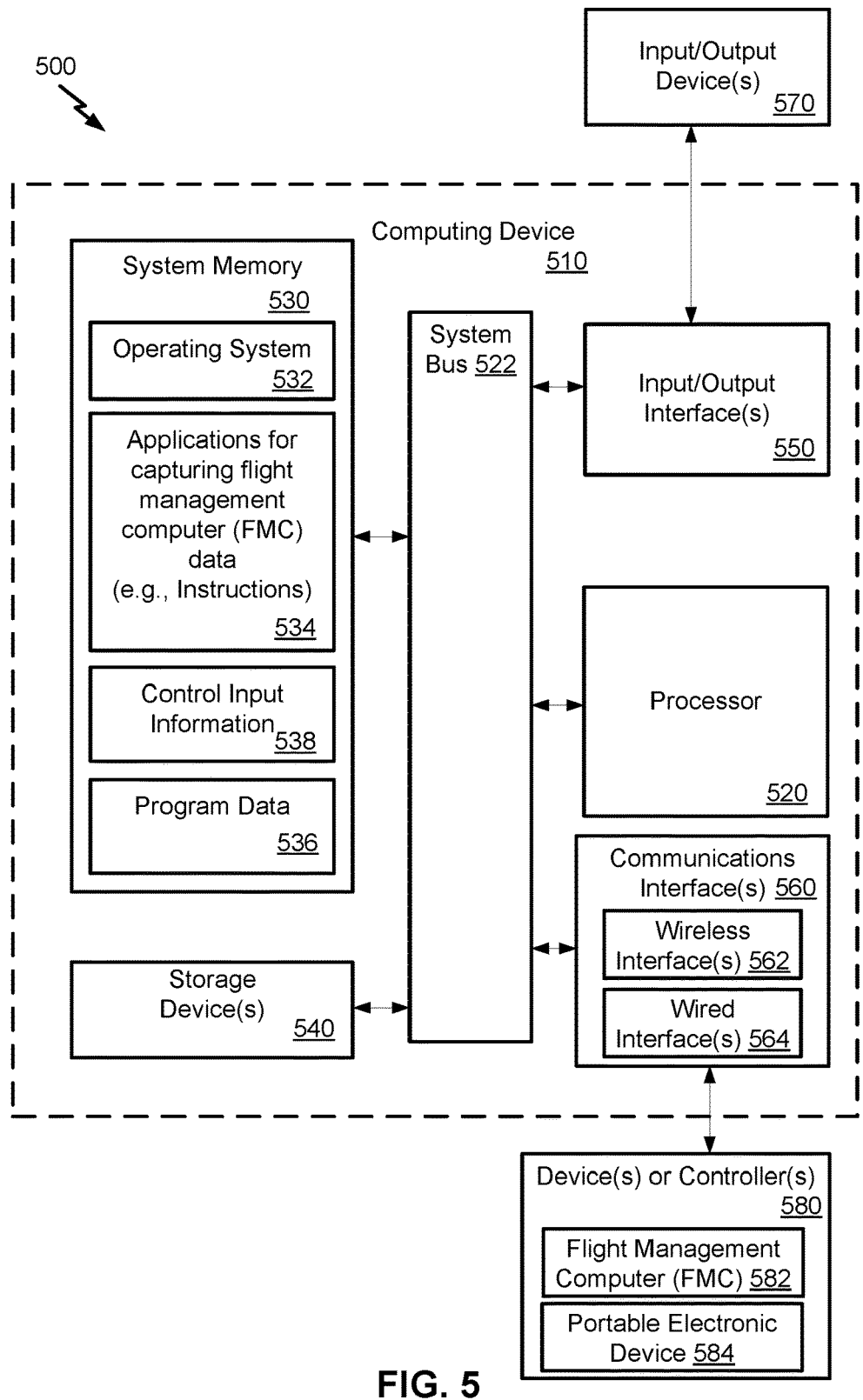
FIG. 5 is an illustration of a block diagram of a computing environment including a general purpose computing device configured to support embodiments of computer-implemented methods and computer-executable program instructions (or code) according to the present disclosure.

FIG. 5 is an illustration of a block diagram of a computing environment 500 including a general purpose computing device 510 including hardware and software configured to support embodiments of computer-implemented methods and computer-executable program instructions (or code) according to the present disclosure. For example, the computing device 510, or portions thereof, may execute instructions to capture FMC data from an FMC of a vehicle (e.g., an aircraft). For example, the instructions may correspond to the data capture component 116 of the CDU 102 of FIGS. 1-3. In some cases, the instructions may further include data capture instructions stored in a memory of the CDU (e.g., the FMC data capture control input(s) 150 stored in the memory 110, as shown in FIG. 1). The computing device 510, or portions thereof, may further execute instructions according to any of the methods described herein.

The computing device 510 may include a processor 520 and a system bus 522. The processor 520 may communicate with the system memory 530, one or more storage devices 540, one or more input/output interfaces 550, one or more communications interfaces 560, or a combination thereof (e.g., via the system bus 522). For example, FIG. 5 illustrates that the communications interfaces 560 may include a wireless communications interface 562 and a wired communications interface 564. For example, the wireless communications interface 562 may correspond to the wireless interface 114 of the control display unit 102 illustrated in FIGS. 1-3. The wired communications interfaces 564 may correspond to the FMC interface 112 of the CDU 102 illustrated in FIGS. 1-3. The system memory 530 may include volatile memory devices (e.g., random access memory (RAM) devices), nonvolatile memory devices (e.g., read-only memory (ROM) devices, programmable read-only memory, and flash memory), or both. The system memory 530 may include an operating system 532, which may include a basic/input output system for booting the computing device 510 as well as a full operating system to enable the computing device 510 to interact with users, other programs, and other devices. The system memory 530 may include one or more applications 534 which may be executable by the processor 520. For example, the one or more applications 534 may include instructions executable by the processor 520 to capture FMC data from an FMC to be provided to a portable electronic device via a wireless interface. The system memory 530 may include program data 536 usable for controlling the capture of FMC data from the FMC.

The processor 520 may also communicate with one or more storage devices 540. For example, the one or more storage devices 540 may include nonvolatile storage devices, such as magnetic disks, optical disks, or flash memory devices. The storage devices 540 may include both removable and non-removable memory devices. The storage devices 540 may be configured to store an operating system, images of operating systems, applications, and program data. In a particular embodiment, the memory 530, the storage devices 540, or both, include tangible computer-readable media.

The processor 520 may also communicate with one or more input/output interfaces 550 that enable the computing device 510 to communicate with one or more input/output devices 570 to facilitate user interaction. The processor 520 may detect interaction events based on user input received via the input/output interfaces 550. Additionally, the processor 520 may send a display to a display device via the input/output interfaces 550.

The processor 520 may communicate with devices or controllers 580 via the one or more communications interfaces 560. For example, the devices or controllers 580 may include an FMC 582 and/or a portable electronic device 584. To illustrate, the FMC 582 of FIG. 5 may correspond to the FMC 104 illustrated in FIGS. 1-3, and the portable electronic device 584 may correspond to the portable electronic device 106 illustrated in FIGS. 1-3.

Figure 6:
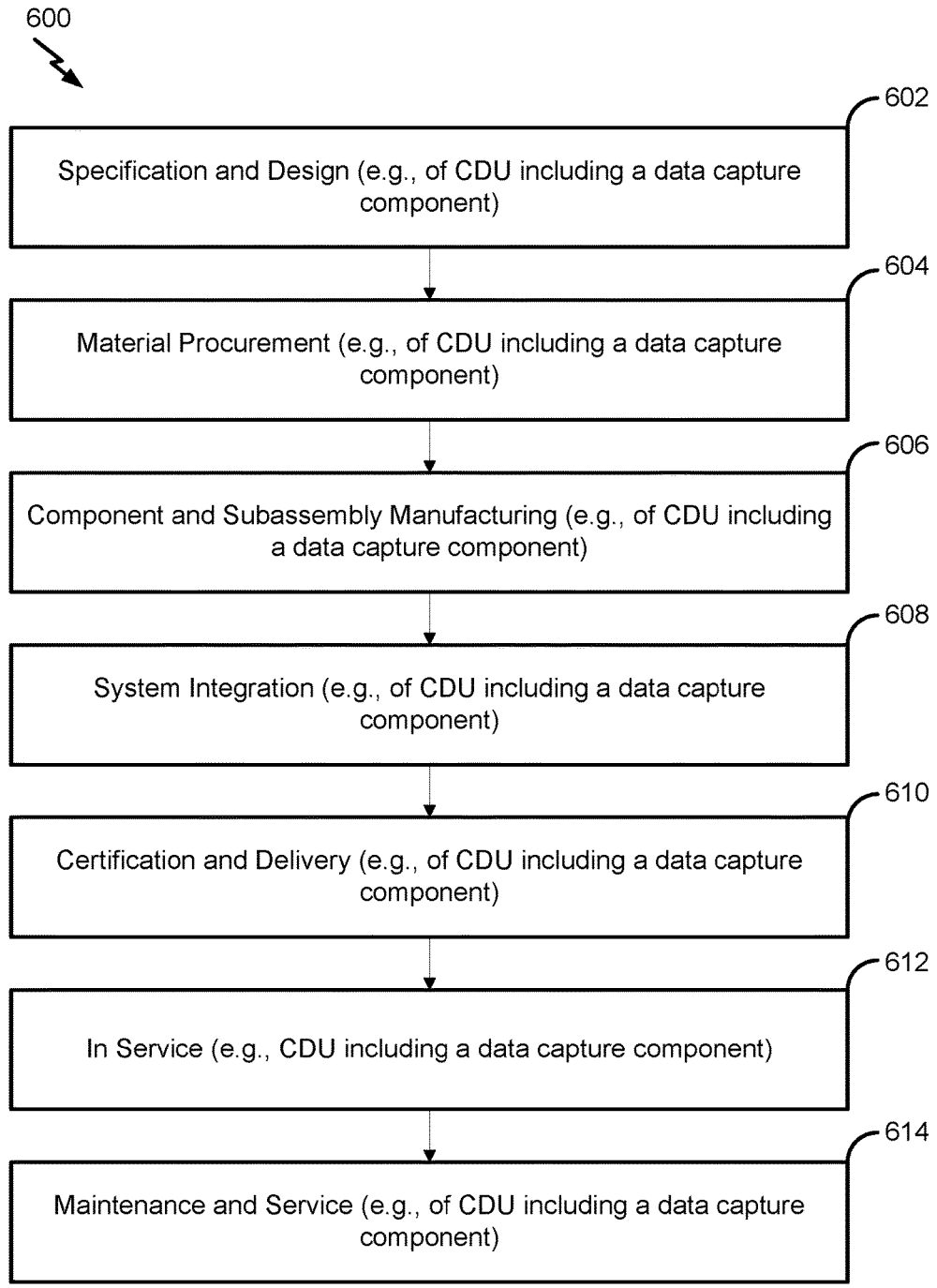
FIG. 6 is a flow diagram of aircraft production and service methodology.
Figure 7:
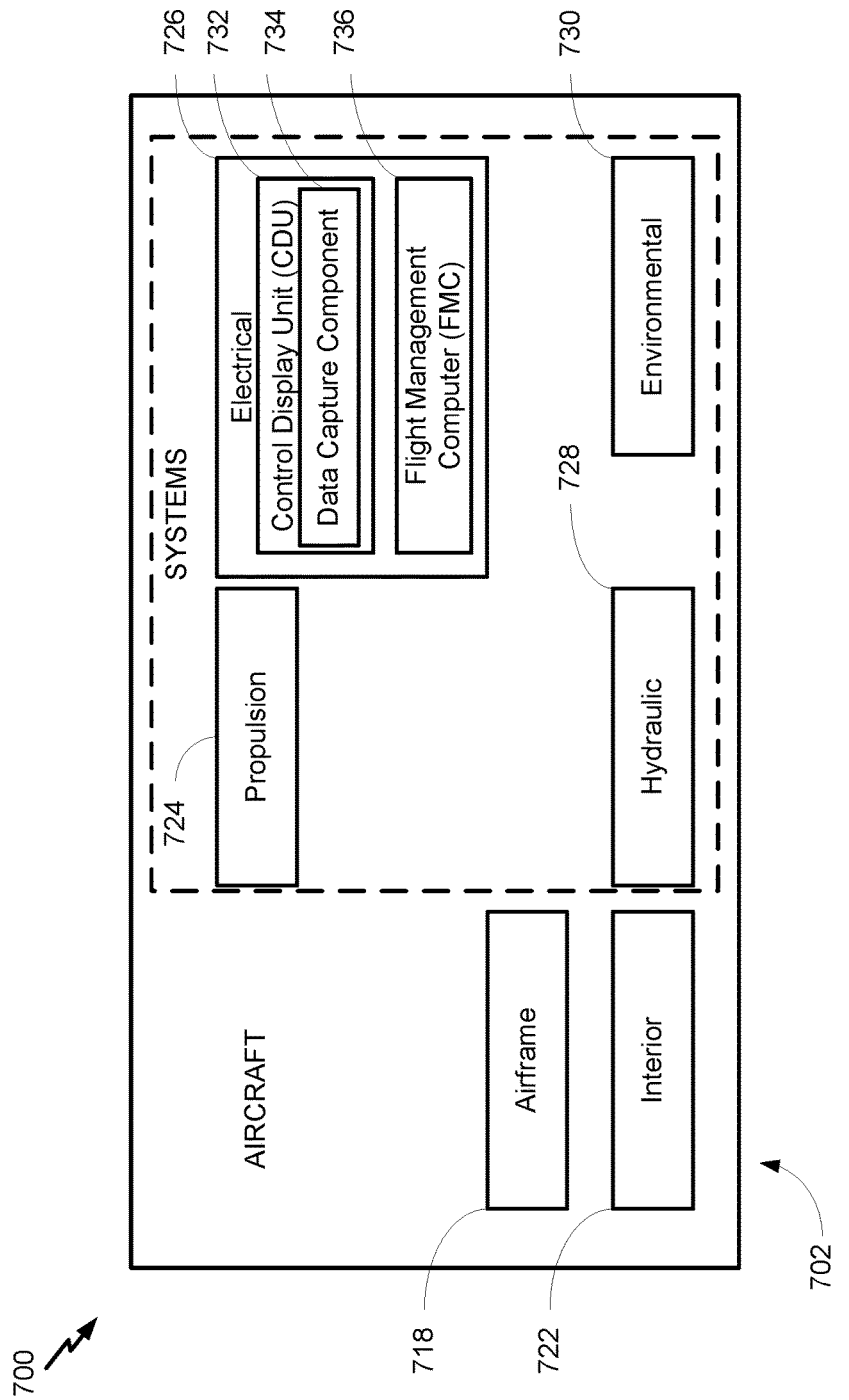
FIG. 7 is a block diagram of an aircraft.

Embodiments of the disclosure may be described in the context of an aircraft manufacturing and service method 600 as shown in FIG. 6 and an aircraft 702 as shown in FIG. 7. The aircraft 702 includes a control display unit (CDU) 732 (that includes a data capture component 734) and a flight management computer (FMC) 736. In some cases, the CDU 732 may correspond to the CDU 102 illustrated in FIGS. 1-3, the data capture component 734 may correspond to the data capture component 116 of the CDU 102, and the FMC 736 may correspond to the FMC 104. During pre-production, exemplary method 600 may include specification and design 602 of the aircraft 702 and material procurement 704. During production, component and subassembly manufacturing 606 and system integration 608 of the aircraft 702 takes place. Thereafter, the aircraft 702 may go through certification and delivery 610 in order to be placed in service 612. While in service by a customer, the aircraft 702 is scheduled for routine maintenance and service 614 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 702 produced by exemplary method 600 may include an airframe 718 with a plurality of systems 720 and an interior 722. Examples of high-level systems 720 include one or more of a propulsion system 724, an electrical system 726, a hydraulic system 728, and an environmental system 730. Any number of other systems may be included. Although an aerospace example is shown, the principles of the invention may be applied to other industries, such as the automotive industry.

Apparatus and methods embodied herein may be employed during any one or more of the stages of the production and service method 600. For example, components or subassemblies corresponding to production process 606 may be fabricated or manufactured in a manner similar to components or subassemblies produced while the aircraft 702 is in service. Also, one or more apparatus embodiments, method embodiments, or a combination thereof may be utilized during the production stages 606 and 608, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 614.

Figure 8:
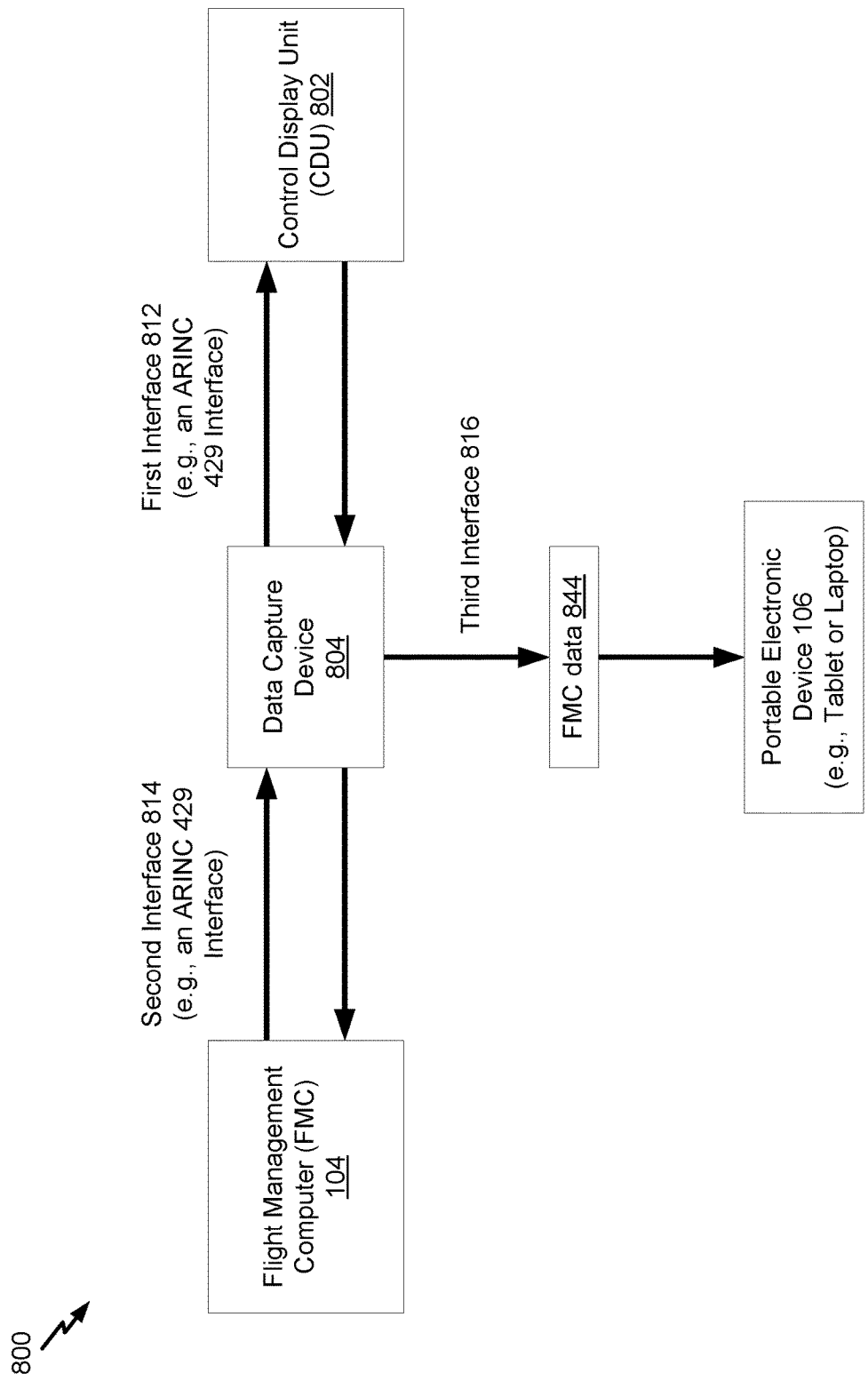
FIG. 8 is a block diagram of a particular embodiment of a system to provide FMC data from a data capture device independent of a CDU to a portable electronic device via a wireless interface of the data capture device.

FIG. 8 is a systems diagram 800 depicting a particular example of a system to provide FMC data from a data capture device 804, independent and distinct from a CDU 802, to a portable electronic device 106 via an interface (e.g., a third interface 816) of the data capture device 804. FIG. 8 illustrates that data (e.g., FMC data 844) that is computed by or accessible to the FMC 104 is communicated to the CDU 802 via the data capture device 804. In such implementations, the CDU 802 includes a data request component, and the data capture device 804 includes a data capture component, as described further with reference to FIG. 9.

The data capture device 804 receives the FMC data 844 from the FMC 104 via a second interface 814 and sends the FMC data 844 to the CDU 802 via a first interface 812. The FMC data 844 may be utilized or displayed by the CDU 802 as described with reference to FIGS. 1-7. The data capture device 804 may also "capture" the FMC data 844 and send the FMC data 844 (or a portion thereof) to the portable electronic device 106 via a third interface 816 (e.g., a wireless interface or a wired interface). An EFB application at the portable electronic device 106 may utilize the FMC data 844 that is provided via the data capture device 804 to perform various calculations, as described with reference to FIGS. 1-7. The first interface 812, the second interface 814, or both, may include or correspond to the FMC interface 112 of FIG. 1, and the third interface 816, may include or correspond to the wireless interface 114 of FIG. 1. In the particular implementation illustrated in FIG. 8, the first interface 812 and the second interface 814 correspond to ARINC 429 interfaces and communicate over an ARINC 429 data bus. The CDU 802 and the data capture device 804 are described further with reference to FIG. 9.

Figure 9:
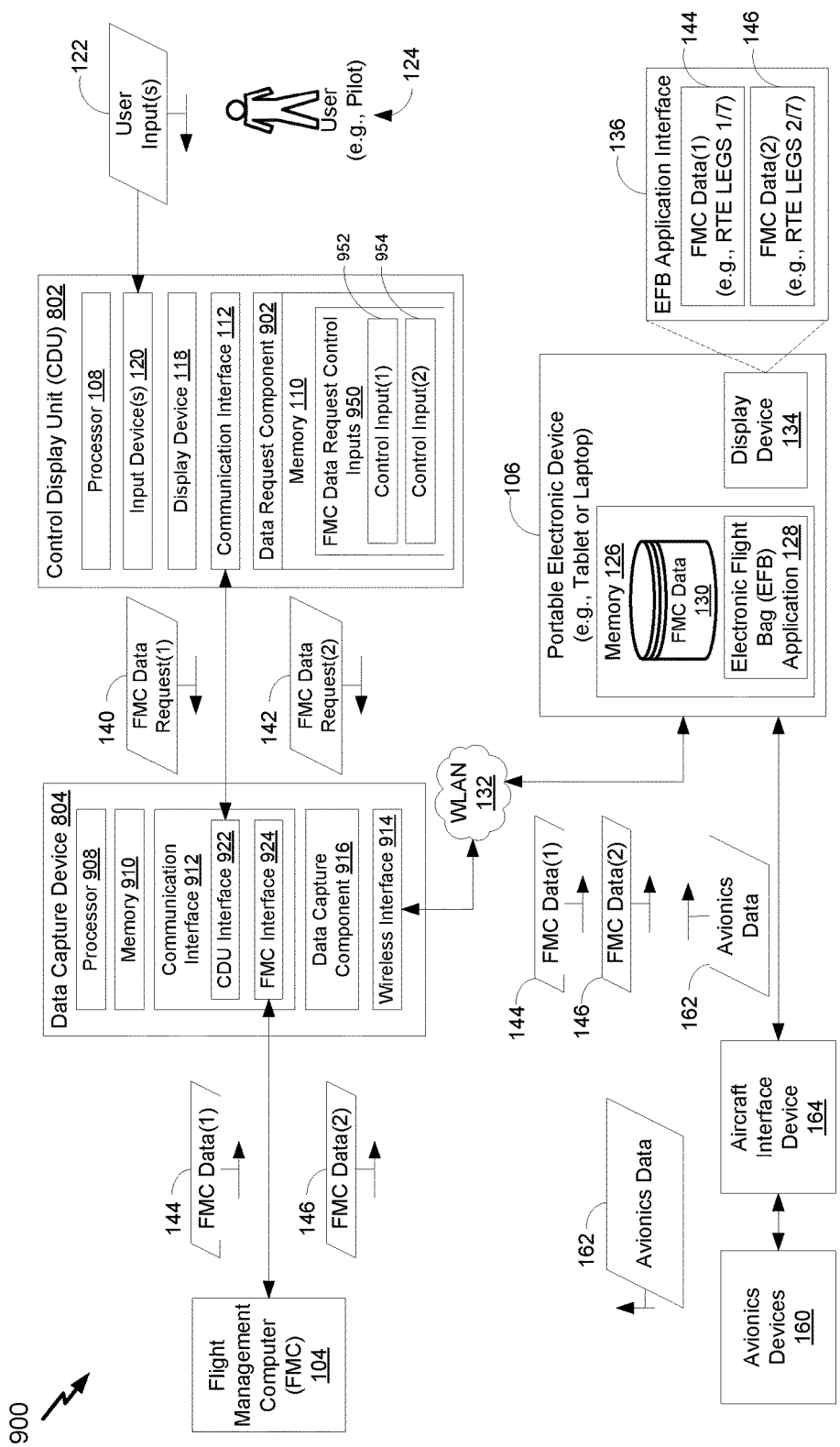
FIG. 9 is a block diagram of another particular embodiment of a system to provide FMC data from a data capture device independent of a CDU to a portable electronic device via a wireless interface of the data capture device.

FIG. 9 is a system diagram 900 depicting a particular example of a system to provide FMC data from the data capture device 804 (independent of the CDU 802) to the portable electronic device 106 via a wireless interface 914 of the data capture device 804. As illustrated in FIG. 9, the data capture device 804 includes the wireless interface 914, in other implementations the data capture device 804 includes, in addition to or in the alternative, a wired interface (not shown). The wired interface may include or correspond to an ARINC 429 interface or an ARINC 739 interface.

In the example illustrated in FIG. 9, the system 900 includes the CDU 802, the data capture device 804, the FMC 104, and the portable electronic device 106. The CDU 802 includes the processor 108, the memory 110, and the communication interface 112 to communicate with the FMC 104 via the data capture device 804. In other implementations, the CDU 802 further includes a wireless interface, such as the wireless interface 114 of FIG. 1.

FIG. 9 further illustrates that the CDU 802 includes the display device 118 and the input device 120 (or multiple input devices). As described herein with respect to FIGS. 2 and 3, the display device 118 may display information responsive to the user input 122 (or multiple user inputs) received from the user 124 (e.g., a crew member, such as a pilot or a co-pilot) via the input device 120. Alternatively or additionally, the display device 118 may display information that is received at the CDU 802 from the FMC 104 (via the data capture device 804) and/or other information from one or more avionics devices that are accessible to the CDU 802.

The CDU 802 further includes a data request component 902. The data request component 902 is configured to generate FMC data requests to be sent to the FMC 104 via the data capture device 804. For illustrative purposes only, FIG. 9 illustrates that CDU 802 may generate a first FMC data request 140 (identified as "FMC Data Request(1)" in FIG. 9) and a second FMC data request 142 (identified as "FMC Data Request(2)" in FIG. 9). The first FMC data request 140 and the second FMC data request 142 are sent to the data capture device 804 via the communication interface 112. A communication interface 912 of the data capture device 804 receives the first FMC data request 140 and the second FMC data request 142 at a CDU interface 922 and sends (e.g., relays) the first FMC data request 140 and the second FMC data request 142 to the FMC 104 via an FMC interface 924.

In a particular embodiment, the FMC data (e.g., first avionics data) may be communicated from the FMC 104 to the CDU 802 via the data capture device 804 in accordance with a first avionics communication standard (e.g., an ARINC 429 standard). In other implementations, the first avionics communication standard may correspond to a standard for MCDUs and associated interfaces (e.g., an ARINC 739 standard).

The data capture device 804 includes a processor 908, a memory 910, the communication interface 912, a second communication interface (e.g., the wireless interface 914), and a data capture component 916. The data capture component 916 is executable by the processor 908 to perform various operations. In FIG. 9, the data capture component 916 is shown as being separate from the memory 910. However, in some implementations, the data capture component 916 may be stored in the memory 910. It will be appreciated that the data capture component 916 may be implemented in hardware, software, or a combination thereof. The data capture component 916 of the data capture device 804 is configured to capture FMC data (or a portion thereof) exchanged between the FMC 104 and the CDU 802 and to send the captured data to other electronic devices (e.g., the portable electronic device 106) via the second communication interface (e.g., the wireless interface 914). The data capture component 916 is configured to capture and send the captured data to the other electronic devices based on FMC data requests, FMC data, one or more conditions being satisfied or a combination thereof. The one or more conditions may be associated with one or more of a flight stage, an air speed, an altitude, an amount of time, or a combination thereof.

The CDU interface 922 is configured to send data to and receive data from the CDU 802, and the FMC interface 924 is configured to send data to and receive data from the FMC 104. In some implementations, the data capture device 804 includes multiple transmitters and receivers to exchange data with the CDU 802 and the FMC 104 via the communication interface 912. In a particular implementation, the communication interface 912 includes or corresponds to an ARINC 429 interface. The second communication interface, illustrated as the wireless interface 914 in FIG. 9, is configured to exchange data with one or more electronic devices, such as the portable electronic device 106. In some implementations, the second communication interface is configured to exchange data according to the same standard as the communication interface 912. In other implementations, the second communication interface is configured to exchange data according to a different standard. In such implementations, data capture device 804 (e.g., the data capture component 916 of the data capture device 804) is configured to convert captured data from a first standard (e.g., ARINC 429 data) to a second standard (e.g., ARINC 739 data) before sending the data to other electronic devices.

In a particular implementation, the wireless interface 914 may be configured to send and/or receive data in accordance with an IEEE 802.11 wireless communication protocol. In other implementations, the wireless interface 914 may be configured to send and/or receive data in accordance with an NFC standard or a wireless ad hoc network protocol.

FIG. 9 illustrates that the portable electronic device 106 (e.g., a tablet computing device or a laptop computer) includes the memory 126 to store the EFB application 128 (or multiple EFB applications). FIG. 9 further illustrates that the memory 126 may include an FMC data store 130 that includes FMC data that is received at the portable electronic device 106 via one or more wireless transmissions from the data capture device 804 (e.g., data communicated from the data capture device 804 via the WLAN 132). The portable electronic device 106 further includes the display device 134 (e.g., a second display device that is different from the display device 118 of the CDU 102). The portable electronic device 106 may be configured to display the EFB application interface 136 associated with the EFB application 128 via the display device 134.

The FMC 104 is configured to provide first FMC data 144 (identified as "FMC Data(1)" in FIG. 9) to the data capture device 804 responsive to the first FMC data request 140. The FMC 104 is further configured to provide second FMC data 146 (identified as "FMC Data(2)" in FIG. 9) to the data capture device 804 responsive to the second FMC data request 142. The CDU 802 may be configured to generate the first FMC data request 140 and/or the second FMC data request 142 responsive to manual control input(s) received via the input device(s) 120 of the CDU 802, responsive to data request script(s) stored in the memory 110 that operate "in the background" to automatically request particular FMC data, or responsive to request(s) received for particular FMC data from other devices (e.g., from the portable electronic device 106 via the data capture device 804).

In a particular implementation, the data capture component 916 may capture the FMC data transmitted from the FMC 104 to the CDU 802 via the data capture device 804 responsive to data capture script(s) stored in the memory 910 to automatically capture particular FMC data, or responsive to request(s) received for particular FMC data from other devices (e.g., from the portable electronic device 106 via the wireless interface 914).

In some implementations, control input information associated with an FMC data request (or multiple FMC data requests) may be stored in the memory 110 of the CDU 802. In some cases, a data request component 902 may be configured to "operate in the background" by automatically generating FMC data request(s) based on the control input information stored in the memory 110. To illustrate, the control input information may correspond to a particular FMC data request to be generated at a particular flight stage. As an example, the data request component 902 may be configured to automatically generate an FMC data request (e.g., at a first flight stage) based on first control input information stored in the memory 110. As another example, the data request component 902 may be configured to automatically generate an FMC data request (e.g., at a second flight stage) based on second control input information stored in the memory 110. In some cases, the FMC data that is received at the CDU 802 from the FMC 104 responsive to a particular FMC data request may not be displayed at the display device 118 of the CDU 802. For example, a display of the display device 118 of the CDU 802 may be maintained in response to receiving the particular FMC data.

In the particular embodiment illustrated in FIG. 9, one or more FMC data request control inputs 950 are stored in the memory 110 of the CDU 802. In the example of FIG. 9, the FMC data request control input(s) 950 include a first data request control input 952 (identified as "Control Input(1)" in FIG. 9) and a second data request control input 954 (identified as "Control Input(2)" in FIG. 9). To illustrate, the first data request control input 952 may be associated with a first flight stage and may include first control input information corresponding to a particular FMC data request (e.g., the first FMC data request 140) to be generated at the first flight stage. As another example, the second data request control input 954 may be associated with a second flight stage and may include second control input information corresponding to a particular FMC data request (e.g., the second FMC data request 142) to be generated at the second flight stage. In alternative embodiments, the FMC data request control input(s) 950 may include a different number of data request control inputs (e.g., associated with an alternative number of flight stages, times, parameters, etc.). In some cases, a particular data request "script" may be stage-of-flight dependent (e.g., on the ground, in-flight, below a particular air/ground speed, below a particular altitude, or a combination thereof). As an example, the first data request control input 952 may be automatically invoked and executed "in the background" at the CDU 802 when the aircraft is above or below a first altitude threshold and is operating above or below a first air speed threshold. As another example, the second data request control input 954 may be automatically invoked and executed "in the background" at the CDU 802 when the aircraft is above or below a second altitude threshold and is operating above or below a second air speed threshold.

FIG. 9 further illustrates that the FMC 104 may be configured to communicate with multiple avionics devices 160. In a particular embodiment, avionics data 162 may be communicated between a first avionics device and a second avionics device in accordance with a second avionics communication standard that is different from a first avionics communication standard associated with communication between the FMC 104, the data capture device 804, and the CDU 802. FIG. 9 illustrates that, in some cases, the avionics data 162 may be accessible to the portable electronic device 106 via an aircraft interface device 164 that is different from the CDU 802. In other implementations, the avionics data 162 may be communicated in accordance with the first avionics communication standard.

In some cases, the FMC 104 may be configured to receive data from air traffic control (ATC) systems before and/or during a flight. Further, the FMC 104 may be configured to receive input(s) from the user 124 (e.g., the pilot) before and/or during a flight. In a particular embodiment, the data request component 902 of the CDU 802 may be configured to retrieve such information from the FMC 104 (e.g., while the aircraft is on the ground). The data capture component 916 of the data capture device 804 may be configured to capture the data during retrieval of the data and provide the captured data to the EFB application 128 of the portable electronic device 106 via the wireless interface 914 (for use in performing various calculations). In some cases, the EFB application 128 may be configured to query the CDU 802 for particular data (e.g., before and/or during flight), and the data request component 902 of the CDU 802 may be configured to generate requests for associated FMC data in response to the query. The data capture device 804 is configured to provide the FMC data to the EFB application 128 responsive to the query.

In some cases, the EFB application 128 may send a "trigger" to the CDU 802 that includes a set of parameters, and the data request component 902 of the CDU 802 may respond to the "trigger" by generating one or more FMC data request(s) based on the set of parameters. Data received from the FMC 104 responsive to the FMC data request(s) generated based on the parameter(s) may be communicated from the data capture device 804 to the EFB application 128. In the present disclosure, the data capture device 804 may be installed on a vehicle (e.g., an aircraft) without any changes to the CDU 802 and/or the FMC 104. As communications between the CDU 802, the data capture device 804, and the FMC 104 may utilize an approved (e.g., certified) communication interface 112 and there may be no additional approval/certification that may be cumbersome and/or costly.

In some embodiments, data from the FMC 104 may be periodically synchronized with information that is stored at the FMC data store 130 of the portable electronic device 106. As an example, the user 124 (e.g., the pilot) may initiate a data synchronization operation. As another example, synchronization may occur automatically at one or more pre-determined times and/or pre-determined intervals. To illustrate, the FMC data request control inputs 950 may include a synchronization control input that may be communicated from the CDU 802 to the FMC 104 via the data capture device 804. The FMC 104 may provide particular data to the CDU 802 and/or the portable electronic device 106 via the data capture device 804 in response to the synchronization control input. Alternatively, the data capture component 916 may generate a synchronization control input that may be communicated from the data capture component 916 to the FMC 104, and the FMC 104 may provide particular data to the CDU 802 and/or the portable electronic device 106 via the data capture device 804 in response to the synchronization control input.

In a particular embodiment, while not shown in the example of FIG. 9, the EFB application interface 136 may allow the user 124 to input various flight data (e.g., before and/or during a flight). In some cases, information that is provided by the user 124 may be used by the EFB application 128 to provide data to the CDU 802 via the wireless interface 914. For example, the EFB application 128 sends a second user input to the data capture device 804 via the wireless interface 914, and the data capture device 804 relays the second user input to the CDU 802 via the communication interface 912. The data (e.g., the second user input) that is provided to the CDU 802 may be displayed to the user 124 via the display device 118 of the CDU 802, and the user 124 may review the data for submission to the FMC 104.

In a particular embodiment, the data capture component 916 may be configured to (automatically) provide updated information to the portable electronic device 106 (e.g., in response to the user 124 updating a flight route during flight via the CDU 802 due to air traffic controls, weather, etc.). The updated information may allow the EFB application 128 of the portable electronic device 106 to (automatically) update various calculations for display via the EFB application interface 136.

In operation, the data request component 902 of the CDU 802 may generate an FMC data request. In some cases, the data request component 902 may generate an FMC data request based on a particular control input (or sequence of control inputs) received from the user 124 (e.g., the pilot) via one or more selectable control inputs of the CDU 802. In other cases, the data request component 902 may automatically generate an FMC data request based on information stored in the memory 110 of the CDU 802 (e.g., based on the FMC data request control input(s) 950 that may be associated with different flight stages, times, parameters, etc.). As an illustrative, non-limiting example, the data request component 902 generated the FMC data request based on a determination that one or more conditions are satisfied, the one or more conditions may be associated with one or more of a flight stage, an air speed, an altitude, an amount of time, or a combination thereof. The CDU 802 (e.g., the data request component 902 thereof) may send the FMC data request to the data capture device 804 via the communication interface 112.

As an illustrative, non-limiting example, the data request component 902 may generate the first FMC data request 140 responsive to user selection of a first selectable control input (e.g., a "LEGS" key) of the CDU 102. In this case, the first FMC data 144 may represent information associated with a first set of waypoints corresponding to a first flight stage. For example, as illustrated in FIG. 2, the first FMC data 144 may include a listing of the first set of waypoints, airspeed/altitude predictions and constraints, distances between legs, winds, magnetic (or true) headings between legs, and/or estimated times of arrival, among other alternatives.

As another illustrative example, the data request component 902 may generate the second FMC data request 142 responsive to user selection of a second selectable control input (e.g., a "NEXT PAGE" key) of the CDU 802. In this case, the second FMC data 146 may represent information associated with a second set of waypoints corresponding to a second flight stage. For example, as illustrated in FIG. 3, the second FMC data 146 may include a listing of the second set of waypoints, airspeed/altitude predictions and constraints, distances between legs, winds, magnetic (or true) headings between legs, and/or estimated times of arrival, among other alternatives.

The data capture device 804 receives the FMC data request via the CDU interface 922 of the communication interface 912. The data capture device 804 sends (e.g., relays) the FMC data request to the FMC 104 via the FMC interface 924, and the FMC 104 may obtain (e.g., compute) data to be provided to the CDU 802 (via the data capture device 804) based on the particular FMC data request received from the CDU 802. For example, the FMC 104 generates the first FMC data 144 responsive to receiving the first FMC data request 140, and generates the second FMC data 146 responsive to receiving the second FMC data request 142. The FMC 104 sends the FMC data to the data capture device 804.

The data capture device 804 receives the FMC data (e.g., the first FMC data 144 and the second FMC data 146) from the FMC 104 via the communication interface 912. The data capture device 804 sends (e.g., relays) the FMC data to the CDU 802 via the communication interface 912. The CDU 802 may display or utilize the FMC data, as described with reference to FIGS. 1-7. Additionally, the data capture device 804 may capture the FMC data and provide the FMC data to other devices. The data capture component 916 captures the data and sends the data automatically (e.g., independent of user input at the data capture device). For example, the data capture component 916 may capture the FMC data based on the control input received at the CDU 802, the FMC data request received from the CDU 802, the FMC data received from the FMC 104, one or more conditions being satisfied, scripts running in the data capture device 804, or a combination thereof.

To illustrate, the data capture component 916 may capture and send data based on a control input received at the CDU 802 and included in the FMC data request. Alternatively, the data capture component 916 may capture and send data based on a type of data requested by the FMC data request or an indicator (e.g., a flag bit) in the FMC data request. As another illustration, the data capture component 916 may capture and send data based on a type of data of the FMC data or an indicator (e.g., a flag bit) in the FMC data.

Additionally or alternatively, the data capture component 916 may capture and send data based on one or more scripts running at the data capture device 804. To illustrate, the data capture component 916 may capture data based on an amount of time elapsed since a previous FMC data request or a particular type of FMC data request was received at the data capture device 804. Also, the data capture component 916 may capture data based on a determination that one or more conditions associated with the data are satisfied. The one or more conditions may be associated with one or more of a flight stage, an air speed, an altitude, an amount of time, or a combination thereof. In such implementations, the data capture component 916 may capture the data and sends the data independent of a user input received at the CDU 802 or at the portable electronic device.

In a particular embodiment, the first FMC data request 140 (or a first data capture control input included therein) may allow the data capture component 916 of the data capture device 804 to "automatically" (e.g., without user input) capture the first FMC data 144 (e.g., data computed by the FMC 104 for the first set of waypoints) to be provided to the EFB application 128 via the wireless interface 914 of the data capture device 804. The second data request control input 954 may allow the data capture component 916 of the data capture device 804 to automatically capture the second FMC data 146 (e.g., data computed by the FMC 104 for the second set of waypoints) to be provided to the EFB application 128 via the wireless interface 914 of the data capture device 804. It will be appreciated that the data capture component 916 may refrain from capturing/sending FMC data in the event that a manual control input is received from the user 124 via the input device(s) 120 of the CDU 802 and relayed to the data capture device 804. In some cases, the data capture component 916 may resume capturing/sending FMC data after a threshold amount of time has elapsed after receipt of the manual control input (e.g., 100 milliseconds after receiving a last manual control input). Thus, the data capture component 916 may include logic that allows the data capture device 804 to respond to typical requests for data from the user 124 without interfering with pilot activities.

The data capture component 916 may send the captured FMC data received from the FMC 104 to the portable electronic device 106 via the wireless interface 914 of the data capture device 804. In a particular implementation, the FMC data may be sent to the portable electronic device 106 in accordance with an IEEE 802.11 wireless communication protocol. In other implementations, the FMC data may be sent to the portable electronic device 106 in accordance with a near field communication (NFC) standard or in accordance with a wireless ad hoc network protocol. In some cases, the FMC data received at the portable electronic device 106 may be stored in the FMC data store 130. The EFB application 128 may generate the EFB application interface 136 based on the FMC data received from the data capture device 804. The EFB application interface 136 may be displayed at the display device 134 of the portable electronic device 106.

As an illustrative, non-limiting example, the first FMC data 144 presented via the EFB application interface 136 may include at least a portion of information computed by the FMC 104 for the first set of waypoints (e.g., a first page out of seven pages of "RTE LEGS" data, as shown in FIG. 2). As another example, the second FMC data 146 presented via the EFB application interface 136 may include at least a portion of information computed by the FMC 104 for the second set of waypoints (e.g., a second page out of the seven pages of "RTE LEGS" data, as shown in FIG. 3).

Thus, FIG. 9 illustrates that data computed by or accessible to an FMC responsive to an FMC data request from a CDU may be sent to a portable electronic device via a wireless interface of a data capture device independent of the CDU. In some cases, the FMC data request may be communicated from the CDU to the data capture device and from the data capture device to the FMC via a particular type of data bus (e.g., an ARINC 429 data bus), and the data computed by or accessible to the FMC responsive to the FMC data request (e.g., ARINC 429 data) may be communicated from the FMC to the data capture device and from the data capture device to the CDU via the particular type of data bus. Communications between the CDU and the data capture device and between the data capture device and the FMC via the particular type of data bus may be inaccessible to the portable electronic device via other aircraft interface devices. For example, the AID 164 may be able to capture data communicated between the avionics devices 160 via another type of data bus (e.g., an ARINC 739 data bus) for display via the EFB application 128. The AID 164 may be unable to capture data that is communicated over the particular type of data bus (e.g., the ARINC 429 data bus). Thus, the wireless device of the data capture device may provide an EFB application of the portable electronic device with access to FMC data to perform various operations.

Additionally, by using an independent data capture device, a wireless interface may be upgraded more frequently and with reduced costs as compared to a wireless interface of the CDU. For example, the data capture device may be upgraded or replaced periodically to incorporate new hardware or software to support new wireless protocols without replacing the CDU, which may be expensive and require certification. Further, by using an independent data capture device, an aircraft may be upgraded or retrofit to include the independent data capture device without replacing or recertifying the CDU.

Figure 10:
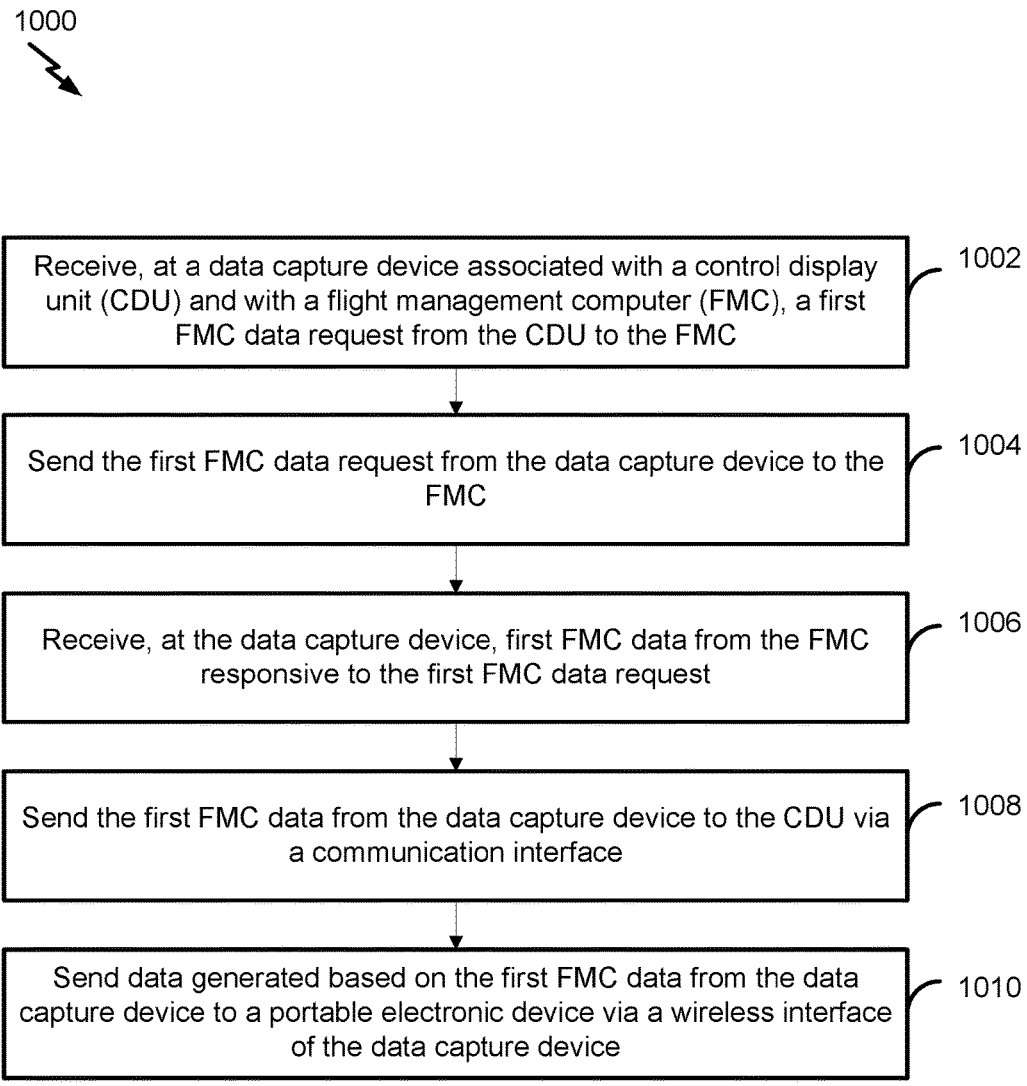
FIG. 10 is a flowchart depicting a particular embodiment of a method of providing FMC data from a CDU to a portable electronic device via a wireless interface of a data capture device.

FIG. 10 is a flowchart depicting a particular embodiment of a method of providing FMC data from a CDU to a portable electronic device via a wireless interface of a data capture device. FIG. 10 illustrates that a data capture device (distinct from a CDU) sends data based on FMC data via a wireless interface of the data capture device to the portable electronic device (e.g., for use by an EFB application).

The method 1000 includes, at 1002, receiving, at a data capture device associated with a control display unit (CDU) and with a flight management computer (FMC), a first FMC data request from the CDU to the FMC. For example, referring to FIG. 9, the data capture device 804 receives the first FMC data request 140 from the CDU 802 via the communication interface 912. The data request component 902 of the CDU 802 may generate the first FMC data request 140 based on one or more conditions being satisfied or based on the user input 122 at the input device 120 of the CDU 802. The method 1000 also includes, at 1004, sending the first FMC data request from the data capture device 804 to the FMC. For example, referring to FIG. 9, the data capture device 804 sends the first FMC data request 140 to the FMC 104 via the communication interface 912, such as the FMC interface 924 of the communication interface 912.

The method 1000 includes, at 1006, receiving, at the data capture device, first FMC data from the FMC responsive to the first FMC data request. For example, referring to FIG. 9, the data capture device 804 may receive the first FMC data 144 responsive to the first FMC data request 140. The method 1000 also includes, at 1008, sending the first FMC data from the data capture device to the CDU via a communication interface. For example, the data capture device sends the first FMC data 144 to the CDU 802 via the communication interface 912, such as the CDU interface 922 of the communication interface 912.

The method 1000 further includes, at 1010, sending data generated based on the first FMC data from the data capture device to a portable electronic device via a wireless interface of the data capture device. For example, the data capture device 804 may send the first FMC data 144 to the portable electronic device 106 via the wireless interface 914 based on the first FMC data request 140, the first FMC data 144, or a determination by the data capture component 916 that one or more conditions are satisfied. The conditions may include or correspond to a flight stage, an air speed, an altitude, or an amount of time. An electronic flight bag (EFB) application is stored at the portable electronic device, and the EFB application is configured to display at least a portion of the data received from the data capture device. As an illustrative, non-limiting example of data generate based on the first FMC data, FIG. 2 illustrates a subset (e.g., the portion 202) of the first FMC data 144 (e.g., the first set of waypoint names and distances in nautical miles) may be displayed via the EFB application interface 136 of the portable electronic device 106.

In some implementations, the method 1000 includes receiving, at the data capture device, a second FMC data request from the CDU, where the first FMC data request and the second FMC data request are generated by a data request component of the CDU. The method 1000 also includes sending the second FMC data request from the data capture device to the FMC and receiving, at the data capture device, second FMC data from the FMC responsive to the second FMC data request. The method 1000 further includes sending the second FMC data from the data capture device to the portable electronic device via the wireless interface of the data capture device. In a particular implementation, the first FMC data includes or identifies a first set of waypoints and the second FMC data includes or identifies a second set of waypoints.

In some implementations, the first FMC data request is generated at a data request component of the CDU in response to a first control input that is received via an input device of the CDU. Additionally or alternatively, the first FMC data request is generated at a data request component of the CDU based on first control input information stored at a memory of the CDU. For example, the first control input information may corresponds to the first data request control input 952, the second data request control input 954, or both. In a particular implementation, the first FMC data request corresponds to a particular FMC data request that is generated at the CDU in response to a condition being satisfied. The condition may include or correspond to a flight stage, an air speed, an altitude, or an amount of time.

In some implementations, a data request component of the CDU automatically generates the first FMC data request independent of a control input received via an input device of the CDU. In a particular implementation, the first FMC data request corresponds to a flight stage change, and a display of a display device associated with the CDU is maintained responsive to receipt of the first FMC data at the CDU.

In some implementations, the first FMC data is communicated from the FMC to the data capture device in accordance with a first avionics communication standard, and the first FMC data is communicated from the data capture device to the CDU in accordance with the first avionics communication standard. In a particular implementation, the first avionics communication standard is a multiple-transmitter data bus protocol standard that allows multiple transmitters to share a single bus, such as an ARINC 429 standard.

In some implementations, first avionics data that is communicated in accordance with the first avionics communication standard via an aircraft interface device (AID) that is different from the data capture device may be inaccessible to the portable electronic device. In such implementations, second avionics data that is communicated from a first avionics device to a second avionics device in accordance with a second avionics communication standard may be accessible to the portable electronic device via the AID.

Figure 11:
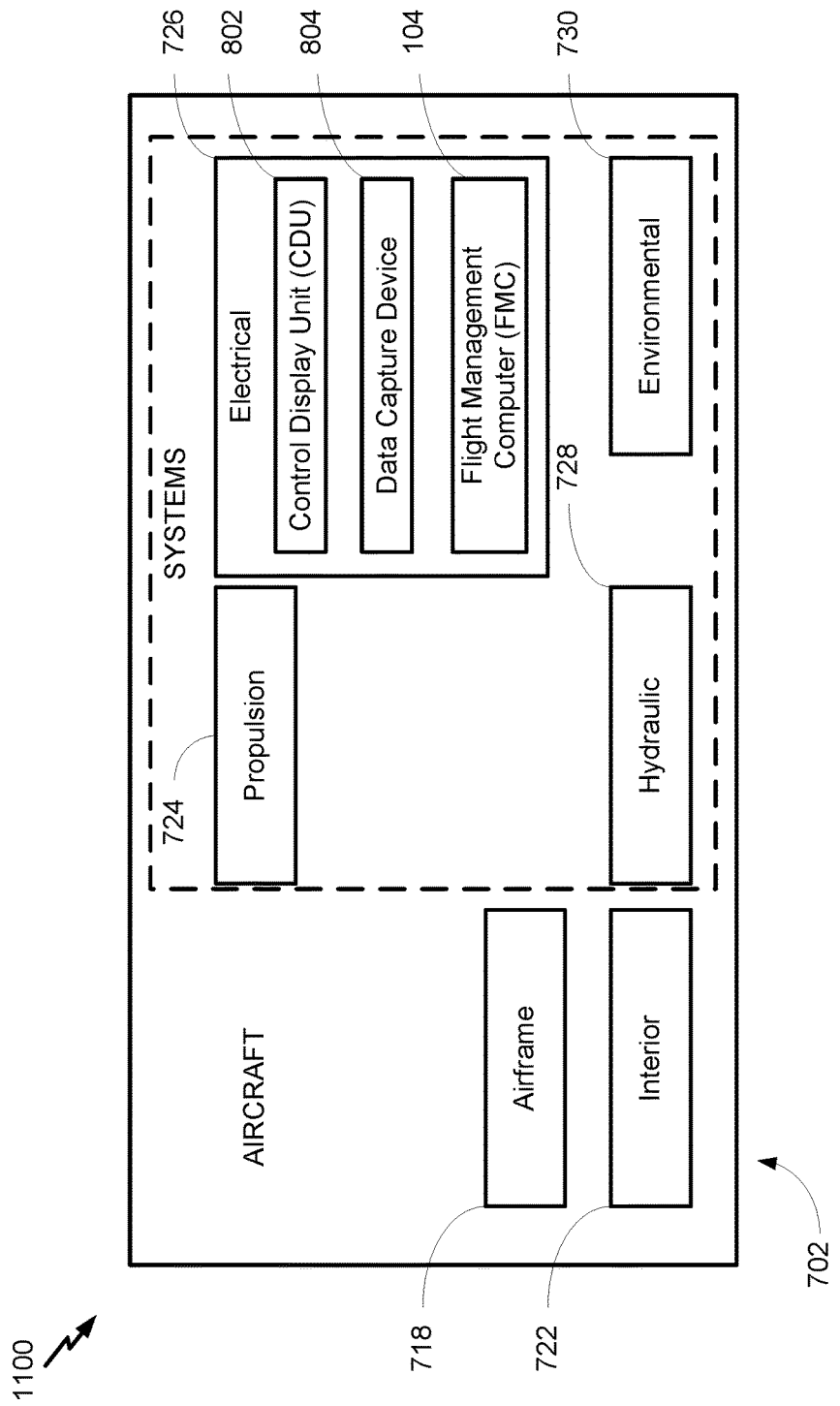
FIG. 11 is a block diagram of an aircraft including a data capture device.

Referring to FIG. 11, a block diagram of an illustrative implementation of the aircraft 702 that includes the data capture device 804 is shown and designated 1100. As shown in FIG. 11, the aircraft 702 may include an airframe 718, an interior 722, and a plurality of systems 720. The plurality of systems 720 may include one or more of a propulsion system 724, an electrical system 726, a hydraulic system 728, or an environmental system 730.

The electrical system 726 includes the CDU 802, the data capture device 804, and the FMC 104. The data capture device 804 (or a data capture component thereof) may be configured to execute computer-executable instructions (e.g., a program of one or more instructions) stored in a memory, such as the memory 910 of FIG. 9. The instructions, when executed, cause the data capture device 804, to perform one or more operations of the method 400 of FIG. 4, the method 1000 of FIG. 10, or both.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   receiving, at a data capture device associated with a control display unit (CDU) and with a flight management computer (FMC), a first FMC data request from the CDU to the FMC;
   sending the first FMC data request from the data capture device to the FMC;
   receiving, at the data capture device, first FMC data from the FMC responsive to the first FMC data request;
   sending the first FMC data from the data capture device to the CDU via a communication interface; and
   sending data generated based on the first FMC data from the data capture device to a portable electronic device via a wireless interface of the data capture device.

2. The method of claim 1, wherein an electronic flight bag (EFB) application is stored at the portable electronic device, and wherein the EFB application is configured to display at least a portion of the data received from the data capture device.

3. The method of claim 2, wherein the portable electronic device includes a tablet computing device or a laptop computer.

4. The method of claim 1, further comprising:
   receiving, at the data capture device, a second FMC data request from the CDU;
   sending the second FMC data request from the data capture device to the FMC;
   receiving, at the data capture device, second FMC data from the FMC responsive to the second FMC data request; and
   sending the second FMC data from the data capture device to the portable electronic device via the wireless interface of the data capture device.

5. The method of claim 4, wherein the first FMC data identifies a first set of waypoints, and wherein the second FMC data identifies a second set of waypoints.

6. The method of claim 1, wherein the first FMC data request is generated at a data request component of the CDU in response to a first control input that is received via an input device of the CDU.

7. The method of claim 1, wherein the first FMC data request is generated at a data request component of the CDU based on first control input information stored at a memory of the CDU, and wherein the first control input information corresponds to a data request control input.

8. The method of claim 7, wherein the first FMC data request corresponds to a particular FMC data request that is generated at the CDU in response to a condition being satisfied, and wherein the condition is associated with one or more of a flight stage, an air speed, an altitude, or an amount of time.

9. The method of claim 1, wherein a data request component of the CDU automatically generates the first FMC data request independent of a control input received via an input device of the CDU, wherein the first FMC data request corresponds to a flight stage change, and wherein a display of a display device associated with the CDU is maintained responsive to receipt of the first FMC data at the CDU.

10. The method of claim 1, wherein the first FMC data is communicated from the FMC to the data capture device in accordance with a first avionics communication standard, and wherein the first FMC data is communicated from the data capture device to the CDU in accordance with the first avionics communication standard.

11. The method of claim 10, wherein first avionics data that is communicated in accordance with the first avionics communication standard is inaccessible to the portable electronic device via an aircraft interface device (AID) that is different from the data capture device.

12. The method of claim 11, wherein second avionics data that is communicated from a first avionics device to a second avionics device in accordance with a second avionics communication standard is accessible to the portable electronic device via the AID.

13. The method of claim 10, and wherein the first avionics communication standard is a multiple-transmitter data bus protocol standard that allows multiple transmitters to share a single bus.

14. A data capture device comprising:
a processor;
a memory;
a communication interface to communicate with a flight management computer (FMC) and a control display unit (CDU);
a wireless interface; and
a data capture component stored in the memory, wherein the data capture component is executable by the processor to perform operations comprising:

receiving an FMC data request from the CDU via the communication interface;
sending the FMC data request to the FMC via the communication interface;
receiving FMC data from the FMC responsive to the FMC data request;
sending the FMC data to the CDU via the communication interface; and
sending data generated based on the FMC data to a portable electronic device via the wireless interface.

15. The data capture device of claim 14, wherein the communication interface corresponds to an Aeronautical Radio Incorporated (ARINC) 429 interface.

16. The data capture device of claim 14, further comprising a second communication interface configured to send second data generated based on second FMC data to an electronic device via the second communication interface.

17. The data capture device of claim 14, wherein the data capture component is configured to send the data to the portable electronic device responsive to receiving the FMC request from the CDU.

18. The data capture device of claim 14, wherein the FMC data includes particular FMC data that is generated by the FMC for display at a display device of the CDU, and where the FMC request is generated responsive to selection of a particular control input at the CDU.

19. A vehicle comprising:
a flight management computer (FMC);
a control display unit (CDU); and
a data capture device communicatively coupled to the FMC and to the CDU, wherein the data capture device is configured to:
receive an FMC data request from the CDU via a communication interface;
send the FMC data request to the FMC via the communication interface;
receive FMC data from the FMC responsive to the FMC data request;
send the FMC data to the CDU via the communication interface; and
send data generated based on the FMC data to a portable electronic device via a wireless interface.

20. The vehicle of claim 19, wherein the wireless interface is configured to send the FMC data to the portable electronic device in accordance with an Institute of Electrical and Electronics Engineers (IEEE) 802.11 wireless communication protocol or in accordance with a near field communication (NFC) standard.

* * * * *